(12) United States Patent
Yang et al.

(10) Patent No.: US 12,050,836 B2
(45) Date of Patent: Jul. 30, 2024

(54) SCREEN TRANSMISSION PROCESSING METHOD, APPARATUS, AND DEVICE

(71) Applicants: GUANGZHOU SHIYUAN ELECTRONIC TECHNOLOGY COMPANY LIMITED, Guangzhou (CN); GUANGZHOU SHIZHEN INFORMATION TECHNOLOGY CO., LTD., Guangzhou (CN)

(72) Inventors: Jiaye Yang, Guangzhou (CN); Nan Tian, Guangzhou (CN); Zhiqiang Xiao, Guangzhou (CN); Yingyan Xin, Guangzhou (CN); Qun Wang, Guangzhou (CN); Yichang Gu, Guangzhou (CN)

(73) Assignees: GUANGZHOU SHIYUAN ELECTRONIC TECHNOLOGY COMPANY LIMITED, Guangzhou (CN); GUANGZHOU SHIZHEN INFORMATION TECHNOLOGY CO., LTD., Guangzhou (CN)

( * ) Notice: Subject to any disclaimer, the term of this patent is extended or adjusted under 35 U.S.C. 154(b) by 233 days.

(21) Appl. No.: 17/551,150

(22) Filed: Dec. 14, 2021

(65) Prior Publication Data
US 2022/0107776 A1    Apr. 7, 2022

Related U.S. Application Data

(63) Continuation of application No. PCT/CN2019/125032, filed on Dec. 13, 2019.

(30) Foreign Application Priority Data

Aug. 9, 2019  (CN) .......................... 201910735830.1

(51) Int. Cl.
*G06F 3/14*    (2006.01)
*G06F 8/65*    (2018.01)
*H04W 76/10*  (2018.01)

(52) U.S. Cl.
CPC .............. *G06F 3/1454* (2013.01); *G06F 8/65* (2013.01); *H04W 76/10* (2018.02)

(58) Field of Classification Search
CPC ......... G06F 3/1454; G06F 8/65; H04W 76/10
See application file for complete search history.

(56) References Cited

U.S. PATENT DOCUMENTS 8,335,539 B1 * 12/2012 Wu ....................... G06F 1/1632
                                                          348/207.99
9,071,866 B2 *  6/2015 Mason ..................... H04B 1/02
(Continued)

FOREIGN PATENT DOCUMENTS

CN    105302603 A    2/2016
CN    108307369 A    7/2018
(Continued)

OTHER PUBLICATIONS

International Search Report issued in corresponding international application No. PCT/CN2019/125032, dated May 9, 2020, 2 pages.
(Continued)

*Primary Examiner* — Charles L Beard
(74) *Attorney, Agent, or Firm* — BAYES PLLC

(57) ABSTRACT

A screen transmission processing method and device. The method includes determining that a source device is connected to a screen transmission device, wherein the screen transmission device is configured to be in a communication connection with a target device with which a pairing is completed; determining that a screen transmission client has been installed in the source device; determining that the screen transmission client is in a state to be updated; in
(Continued)

response to the state to be updated, acquiring an update file of the screen transmission client from the target device through the screen transmission device; and according to the update file, updating the screen transmission client.

16 Claims, 19 Drawing Sheets

(56) References Cited

U.S. PATENT DOCUMENTS

| | | | | |
|---|---|---|---|---|
| 9,298,479 | B2* | 3/2016 | Anson | G06F 9/44505 |
| 9,706,241 | B2* | 7/2017 | Felt | H04N 21/482 |
| 10,032,431 | B2* | 7/2018 | Wilde | G06F 13/382 |
| 10,033,709 | B1* | 7/2018 | Hassan | H04L 63/1475 |
| 10,175,971 | B2* | 1/2019 | Oshima | H04L 67/34 |
| 10,372,434 | B1* | 8/2019 | Michel | G06F 8/65 |
| 10,491,760 | B1* | 11/2019 | Lin | H04N 21/43637 |
| 10,545,834 | B1* | 1/2020 | Smith | G06F 3/067 |
| 10,684,842 | B2* | 6/2020 | Lin | H04L 41/082 |
| 11,158,985 | B1* | 10/2021 | Sumida | H04N 21/43635 |
| 11,360,732 | B1* | 6/2022 | Dagani | G09G 5/14 |
| 11,553,231 | B2* | 1/2023 | Li | H04N 21/43615 |
| 2006/0002315 | A1* | 1/2006 | Theurer | H04L 67/1095 370/261 |
| 2006/0007126 | A1* | 1/2006 | Shih | G06F 3/0231 345/156 |
| 2006/0015905 | A1* | 1/2006 | Lee | H04N 21/41407 725/50 |
| 2006/0031779 | A1* | 2/2006 | Theurer | G06F 3/1454 715/781 |
| 2006/0244986 | A1* | 11/2006 | Ferlitsch | H04N 1/0097 358/1.15 |
| 2008/0081614 | A1* | 4/2008 | Lee | G06F 13/385 455/426.1 |
| 2008/0088634 | A1* | 4/2008 | Thompson | G09G 5/00 345/520 |
| 2009/0144715 | A1* | 6/2009 | Chen | G06F 8/65 710/61 |
| 2009/0153434 | A1* | 6/2009 | Cheng | G06F 3/1454 345/1.1 |
| 2009/0248906 | A1* | 10/2009 | Yamada | H04N 1/00461 710/14 |
| 2009/0268699 | A1* | 10/2009 | Takahashi | H04W 72/0446 370/336 |
| 2010/0064228 | A1* | 3/2010 | Tsern | G06F 3/04842 715/740 |
| 2010/0121941 | A1* | 5/2010 | Harrang | G06F 16/24 709/219 |
| 2010/0262925 | A1* | 10/2010 | Liu | H04L 65/762 715/759 |
| 2010/0274848 | A1* | 10/2010 | Altmaier | H04L 67/14 709/228 |
| 2010/0332663 | A1* | 12/2010 | Chang | H04N 5/775 709/227 |
| 2011/0014947 | A1* | 1/2011 | Liang | H04M 1/72409 345/660 |
| 2011/0237189 | A1* | 9/2011 | Ye | G09G 5/006 455/41.2 |
| 2011/0286438 | A1* | 11/2011 | Kyutoku | H04W 76/10 370/338 |
| 2012/0030594 | A1* | 2/2012 | Yokoyama | G06F 3/1454 715/765 |
| 2012/0077586 | A1* | 3/2012 | Pishevar | A63F 13/26 463/31 |
| 2012/0137228 | A1* | 5/2012 | Cheng | H04L 67/06 709/217 |
| 2013/0007224 | A1* | 1/2013 | Yang | H04L 67/131 709/219 |
| 2013/0120251 | A1* | 5/2013 | Lee | G06F 3/1454 345/157 |
| 2013/0181898 | A1* | 7/2013 | Liu | G06F 3/14 345/157 |
| 2013/0189662 | A1* | 7/2013 | Gilbert | A63B 71/0622 434/247 |
| 2013/0221083 | A1* | 8/2013 | Doss | G06F 16/9554 235/375 |
| 2013/0225080 | A1* | 8/2013 | Doss | H04L 67/51 455/41.2 |
| 2013/0230250 | A1* | 9/2013 | Yates | G06V 10/7788 382/190 |
| 2013/0246937 | A1* | 9/2013 | Park | G06F 3/1423 715/751 |
| 2013/0267172 | A1* | 10/2013 | Ko | H04L 51/10 455/41.1 |
| 2013/0278484 | A1* | 10/2013 | Hwang | G06F 3/1423 345/2.3 |
| 2014/0055469 | A1* | 2/2014 | Liu | G06F 3/1454 345/520 |
| 2014/0071145 | A1* | 3/2014 | Lee | G06F 3/1431 345/545 |
| 2014/0104137 | A1* | 4/2014 | Brown | G06F 3/1423 345/1.1 |
| 2014/0104138 | A1* | 4/2014 | Brown | G06F 3/1423 345/1.1 |
| 2014/0162560 | A1* | 6/2014 | Ye | H04N 21/4122 455/41.3 |
| 2014/0368410 | A1* | 12/2014 | Imai | G06F 3/1415 345/2.2 |
| 2014/0368447 | A1* | 12/2014 | Saini | G06F 3/1423 345/173 |
| 2015/0007066 | A1* | 1/2015 | Joo | G06F 3/1423 715/761 |
| 2015/0061970 | A1* | 3/2015 | Kim | G06F 3/1423 345/2.3 |
| 2015/0065035 | A1* | 3/2015 | Kim | H04W 84/10 455/39 |
| 2015/0215371 | A1* | 7/2015 | Zamir | H04L 67/025 709/203 |
| 2015/0332043 | A1* | 11/2015 | Russello | G06F 11/3466 726/22 |
| 2015/0339090 | A1* | 11/2015 | Lee | G06F 3/0488 345/173 |
| 2016/0007084 | A1* | 1/2016 | Kim | H04N 21/44245 725/116 |
| 2016/0014168 | A1* | 1/2016 | Liao | H04L 65/1063 709/204 |
| 2016/0026304 | A1* | 1/2016 | Wu | G06F 1/1692 345/174 |
| 2016/0026305 | A1* | 1/2016 | Wu | G06F 1/1626 345/174 |
| 2016/0026375 | A1* | 1/2016 | Wu | G06F 3/0446 715/765 |
| 2016/0029147 | A1* | 1/2016 | Chiao | G06F 3/013 455/41.3 |
| 2016/0037203 | A1* | 2/2016 | Ogle | H04N 21/42208 725/39 |
| 2016/0048367 | A1* | 2/2016 | Chen | G06F 3/1423 345/2.2 |
| 2016/0085538 | A1 | 3/2016 | Finch | |
| 2016/0132284 | A1* | 5/2016 | Amara Venkata | G09G 5/14 345/634 |
| 2016/0139241 | A1* | 5/2016 | Holz | H04B 17/27 367/128 |
| 2016/0165056 | A1* | 6/2016 | Bargetzi | G06F 3/1454 455/416 |
| 2016/0241806 | A1* | 8/2016 | Ogle | H04N 21/4222 |
| 2016/0294839 | A1* | 10/2016 | Walline | H04W 12/088 |
| 2016/0294872 | A1* | 10/2016 | Walline | G06F 3/0604 |
| 2016/0316259 | A1* | 10/2016 | Kambhatla | H04N 21/44227 |
| 2016/0321206 | A1* | 11/2016 | Kim | G06F 13/4282 |
| 2016/0350058 | A1* | 12/2016 | Zhu | H04N 21/4126 |
| 2016/0364201 | A1* | 12/2016 | Beveridge | G06F 9/452 |
| 2017/0188213 | A1* | 6/2017 | Nirantar | H04L 67/564 |
| 2017/0199715 | A1* | 7/2017 | Manchinasetti | G06F 3/048 |
| 2017/0208418 | A1* | 7/2017 | Conan | H04W 4/50 |
| 2017/0242996 | A1* | 8/2017 | Kang | G06F 21/34 |
| 2017/0311025 | A1* | 10/2017 | Kim | G06F 3/1454 |
| 2017/0366591 | A1* | 12/2017 | Thomas | H04N 21/8456 |

(56) References Cited

U.S. PATENT DOCUMENTS

| | | | | |
|---|---|---|---|---|
| 2018/0061285 | A1* | 3/2018 | Gilbert | G09F 15/005 |
| 2018/0063575 | A1* | 3/2018 | Lee | H04N 21/43637 |
| 2018/0074779 | A1* | 3/2018 | Marquardt | G06F 3/1454 |
| 2018/0129595 | A1* | 5/2018 | Seo | G06F 11/3688 |
| 2018/0176505 | A1* | 6/2018 | Byun | H04N 7/0127 |
| 2018/0197501 | A1* | 7/2018 | Veeramani | H04N 21/43635 |
| 2018/0220993 | A1* | 8/2018 | Poland | A61B 8/56 |
| 2018/0285061 | A1* | 10/2018 | Park | G06F 3/0488 |
| 2018/0359500 | A1* | 12/2018 | Hasek | H04N 21/84 |
| 2019/0079557 | A1* | 3/2019 | Jung | G06F 1/1605 |
| 2019/0102521 | A1* | 4/2019 | Biewer | G16H 80/00 |
| 2019/0121682 | A1* | 4/2019 | Adiletta | G06F 9/48 |
| 2019/0347216 | A1* | 11/2019 | Cheon | H04L 63/08 |
| 2019/0369738 | A1* | 12/2019 | Lee | G06F 3/017 |
| 2020/0053417 | A1* | 2/2020 | Choi | H04N 21/631 |
| 2020/0166919 | A1* | 5/2020 | Ozawa | H01L 22/12 |
| 2020/0245380 | A1* | 7/2020 | Hruby | H04W 76/10 |
| 2020/0389622 | A1* | 12/2020 | Chiang | G06F 9/4413 |
| 2020/0401428 | A1* | 12/2020 | Soman | G06F 9/45558 |
| 2021/0034351 | A1* | 2/2021 | Lee | H04L 12/40 |
| 2021/0160302 | A1* | 5/2021 | Vu | H04L 65/762 |
| 2021/0181852 | A1* | 6/2021 | Hassan | G06F 3/1454 |
| 2021/0181853 | A1* | 6/2021 | Hassan | G06F 3/04815 |
| 2021/0181938 | A1* | 6/2021 | Hassan | G06F 3/1454 |
| 2021/0241705 | A1* | 8/2021 | Frederick | G09G 5/14 |
| 2021/0258306 | A1* | 8/2021 | Dowd | H04L 63/104 |
| 2021/0258623 | A1* | 8/2021 | Cyrell | H04N 21/2387 |
| 2021/0318990 | A1* | 10/2021 | Dhanabalan | G06F 16/13 |
| 2021/0342050 | A1* | 11/2021 | Wang | G06F 3/0486 |
| 2022/0270538 | A1* | 8/2022 | Lin | G06F 3/1454 |
| 2022/0326974 | A1* | 10/2022 | Bond | G06F 9/452 |
| 2022/0374191 | A1* | 11/2022 | Lien | H04N 7/147 |
| 2022/0413670 | A1* | 12/2022 | Liu | H04W 4/00 |
| 2023/0051956 | A1* | 2/2023 | Wallach | G06F 3/1454 |
| 2023/0120442 | A1* | 4/2023 | Luo | G06F 3/1454 715/751 |
| 2023/0152943 | A1* | 5/2023 | Laukkanen | G06F 3/0481 715/788 |
| 2023/0156271 | A1* | 5/2023 | Nagai | H04N 21/43637 725/81 |
| 2023/0161542 | A1* | 5/2023 | Lee | H04N 21/43637 345/2.2 |
| 2023/0205478 | A1* | 6/2023 | Liu | G09G 5/12 345/1.3 |
| 2023/0283497 | A1* | 9/2023 | Fischer | H04L 65/1089 709/204 |
| 2023/0283834 | A1* | 9/2023 | Fischer | H04N 21/4788 725/9 |
| 2023/0291775 | A1* | 9/2023 | Vaid | G06F 16/954 |
| 2023/0297312 | A1* | 9/2023 | Gao | G06F 3/011 345/175 |
| 2023/0297961 | A1* | 9/2023 | Gupta | G06F 3/04817 705/301 |
| 2023/0308861 | A1* | 9/2023 | Fan | H04W 12/45 |
| 2023/0350627 | A1* | 11/2023 | Jeon | H04N 21/4316 |
| 2023/0367441 | A1* | 11/2023 | Gao | G06F 3/1454 |
| 2023/0370674 | A1* | 11/2023 | Riepling | H04N 21/43635 |
| 2024/0040373 | A1* | 2/2024 | Tian | G06F 3/1454 |

FOREIGN PATENT DOCUMENTS

| | | |
|---|---|---|
| CN | 108664229 A | 10/2018 |
| CN | 110442366 A | 11/2019 |
| JP | H021059 A | 1/1990 |
| JP | 2005346450 A | 12/2005 |
| JP | 2011039827 A | 2/2011 |
| JP | 2013025460 A | 2/2013 |
| JP | 2017111551 A | 6/2017 |

OTHER PUBLICATIONS

First Office Action issued in corresponding CN Patent Application No. 201910735830.1, 18 pages.
Patent Search record information in corresponding CN Patent Application No. 201910735830.1, 1pages.
Notice of Reasons for Rejection issued in corresponding Japanese application No. JP2021-576272, 2 pages.

* cited by examiner

SCREEN TRANSMISSION PROCESSING METHOD, APPARATUS, AND DEVICE

CROSS-REFERENCE TO RELATED APPLICATION

The present application is a continuation of International Application No. PCT/CN2019/125032, filed on Dec. 13, 2019, which claims the benefit of priority to Chinese Patent Application No. 201910735830.1, filed on Aug. 9, 2019, both of which are incorporated herein by reference in their entireties.

TECHNICAL FIELD

The embodiments of the present disclosure relate to the field of multimedia processing technology, for example, to a screen transmission processing method, apparatus, and device.

BACKGROUND

In work, study, entertainment and other scenarios, screen transmission operations are widely used. A source device is connected to a screen transmission device, multimedia data of the source device is synchronized to a target device, and the target device plays the content.

Currently, a screen transmission client suitable for performing screen transmission operations is burned in a firmware of the screen transmission device, and a user manually installs the screen transmission client to the source device when the source device is connected to the screen transmission device for the first time.

When the screen transmission client is updated, a new screen transmission client is generally distributed to the target device. The user manually inserts the screen transmission device into the target device, and the target device burns a new screen transmission client into the screen transmission device. The user manually connects the screen transmission device to the source device, and the new screen transmission client is transmitted to the source device for installation.

When the user replaces the screen transmission device, the screen transmission client in the screen transmission device may not be updated, and the user needs to upgrade the screen transmission client in the screen transmission device again, causing a cumbersome operation.

Due to many functions and large size of the screen transmission client, it takes more time for burning, and the storage space of the screen transmission device is fixed, and the volume of the screen transmission client cannot exceed the size of the storage space, thus limiting the development of new functions of the screen transmission client, which has limited the performance of the screen transmission client.

SUMMARY

This summary is provided to introduce a selection of embodiments in a simplified form that are further described below in the Detailed Description. This summary is not intended to exclusively identify key features or essential features of the claimed subject matter, nor is it intended as an aid in determining the scope of the claimed subject matter.

The embodiments of the present disclosure provide a screen transmission processing method, apparatus, device and storage medium, so as to solve a problem of performance limitation caused by burning the screen transmission client in the screen transmission device.

In a first aspect, an embodiment of the present disclosure provides a screen transmission processing method includes determining that a source device is connected to a screen transmission device, wherein the screen transmission device is configured to be in a communication connection with a target device with which a pairing is completed, determining that a screen transmission client has been installed in the source device, wherein the screen transmission client is configured to perform a screen transmission operation between the source device and the target device through the screen transmission device, so that the target device displays screen projection interface data of the source device, determining that the screen transmission client is in a state to be updated; in response to the state to be updated, acquiring an update file of the screen transmission client from the target device through the screen transmission device, and according to the update file, updating the screen transmission client.

In a second aspect, an embodiment of the present disclosure further provides a screen transmission processing method, includes determining that a source device is connected to a screen transmission device, wherein the screen transmission device is in a communication connection with a target device with which a pairing is completed, determining that the source device has not been installed with a screen transmission client, wherein the screen transmission client is configured to perform a screen transmission operation between the source device and the target device through the screen transmission device, so that the target device displays screen projection interface data of the source device, acquiring an installation file of the screen transmission client from the target device through the screen transmission device, and installing the installation file to the source device so as to install the screen transmission client in the source device.

In a third aspect, an embodiment of the present disclosure further provides a screen transmission processing method, includes determining that a screen transmission device is connected to a source device, wherein the screen transmission device is configured to be in a communication connection with a target device with which a pairing is completed, and starting a loader in the screen transmission device, wherein the loader is configured to install and/or update a screen transmission client in the source device, and the screen transmission client is configured to perform a screen transmission operation between the source device and the target device through the screen transmission device, so that the target device displays screen projection interface data of the source device.

In a fourth aspect, an embodiment of the present disclosure further provides a screen transmission processing method, executed by a screen transmission device, wherein the method includes determining to complete a pairing with a target device, determining to connect a source device and establishing a communication connection with the target device, determining an installation state of a screen transmission client on the source device, wherein the screen transmission client is configured to perform a screen transmission operation between the source device and the target device through the screen transmission device, according to the installation state of the screen transmission client on the source device, acquiring an installation file or an update file from the target device, and sending the installation file or the update file to the source device, so that the source device installs or updates the screen transmission client, and acquiring screen projection interface data generated by the screen transmission client in the source device, and sending the screen projection interface data to the target device for display.

In a fifth aspect, an embodiment of the present disclosure further provides a screen transmission processing method, includes determining a loader, and burning the loader into a screen transmission device, wherein the screen transmission device is configured to connect a source device and be in a communication connection with a target device with which a pairing is completed, wherein the loader is configured to determine an installation state of a screen transmission client on the source device, and according to the installation state of the screen transmission client on the source device, acquire an installation file or an update file from the target device and send the installation file or the update file to the source device, so that the source device installs or updates the screen transmission client, and the screen transmission client is configured to perform a screen transmission operation between the source device and the target device through the screen transmission device, so that the target device displays screen projection interface data of the source device.

In a sixth aspect, an embodiment of the present disclosure further provides a screen transmission apparatus, includes a connection determining module, configured to determine that a source device is connected to a screen transmission device, wherein the screen transmission device is configured to be in a communication connection with a target device with which a pairing is completed, an installation determining module, configured to determine that a screen transmission client has been installed in the source device, wherein the screen transmission client is configured to perform a screen transmission operation between the source device and the target device through the screen transmission device, so that the target device displays screen projection interface data of the source device, an update-state determining module, configured to determine that the screen transmission client is in a state to be updated, an update-file acquiring module, configured to, in response to the state to be updated, acquire an update file of the screen transmission client from the target device through the screen transmission device, and a client updating module, configured to, according to the update file, update the screen transmission client.

In a seventh aspect, an embodiment of the present disclosure further provides a screen transmission processing apparatus, includes a connection determining module, configured to determine that a source device is connected to a screen transmission device, wherein the screen transmission device is configured to be in a communication connection with a target device with which a pairing is completed, an uninstallation determining module, configured to determine that the source device has not been installed with a screen transmission client, wherein the screen transmission client is configured to perform a screen transmission operation between the source device and the target device through the screen transmission device, so that the target device displays screen projection interface data of the source device, wherein, the screen transmission device connects the source device and connects the target device, respectively, an installation-file acquiring module, configured to acquire an installation file of the screen transmission client from the target device through the screen transmission device, and a client installing module, configured to install the installation file to the source device so as to install the screen transmission client in the source device.

In an eighth aspect, an embodiment of the present disclosure further provides a screen transmission apparatus, includes a connection determining module, configured to determine that a screen transmission device is connected to a source device, wherein the screen transmission device is configured to be in a communication connection with a target device with which a pairing is completed, and a loader starting module, configured to start a loader in the screen transmission device, wherein the loader is configured to install and/or update a screen transmission client in the source device, and the screen transmission client is configured to perform a screen transmission operation between the source device and the target device through the screen transmission device, so that the target device displays screen projection interface data of the source device.

In a ninth aspect, an embodiment of the present disclosure further provides a screen transmission processing apparatus, located in a screen transmission device, wherein the apparatus includes a first connection module, configured to determine to complete a pairing with a target device, and maintain a communication connection, a second connection module, configured to determine to connect a source device and establishing a communication connection with the target device, an installation-state determining module, configured to determine an installation state of a screen transmission client on a source device, wherein the screen transmission client is configured to perform a screen transmission operation between the source device and the target device through the screen transmission device, a screen-transmission-client processing module, configured to, according to the installation state of the screen transmission client on the source device, acquire an installation file or an update file from the target device, and send the installation file or the update file to the source device, so that the source device installs or updates the screen transmission client, and a screen transmission module, configured to acquire screen projection interface data generated by the screen transmission client in the source device, and send the screen projection interface data to the target device for display.

In a tenth aspect, an embodiment of the present disclosure further provides a screen transmission apparatus, includes a loader determining module, configured to determine a loader, and a loader burning module, configured to burn the loader into a screen transmission device, wherein the screen transmission device is configured to connect a source device and be in a communication connection with a target device with which a pairing is completed, wherein the loader is configured to install and/or update a screen transmission client in the source device, and the screen transmission client is configured to perform a screen transmission operation between the source device and the target device through the screen transmission device, so that the target device displays screen projection interface data of the source device.

In an eleventh aspect, an embodiment of the present disclosure further provides a screen transmission device, which is configured to connect a source device and be in a communication connection with a target device with which a pairing is completed, the screen transmission device includes a loader, configured to determine an installation state of a screen transmission client on the source device, according to the installation state of the screen transmission client on the source device, acquire an installation file or an update file from the target device, and send the installation file or the update file to the source device, so that the source device installs or updates the screen transmission client, wherein the screen transmission client is configured to perform a screen transmission operation between the source device and the target device through the screen transmission device, so that the target device displays screen projection interface data of the source device.

In a twelfth aspect, an embodiment of the present disclosure further provides an electronic device, includes a memory, configured to store one or more programs, wherein when the one or more programs are executed by one or more processors, the one or more processors implement a screen transmission processing method according to the first or second aspect.

In a thirteenth aspect, an embodiment of the present disclosure further provides an electronic device, includes one or more processors, and a memory, configured to store one or more programs, wherein when the one or more programs are executed by one or more processors, the one or more processors implement a screen transmission processing method according to the third or fifth aspect.

In a fourteenth aspect, an embodiment of the present disclosure further provides an electronic device, includes one or more processors, a memory, configured to store one or more programs, a transmission interface, configured to connect a target device or a source device, a wireless communication chip, configured to establish a communication connection with the target device, and a memory, configured to store one or more programs, when the one or more programs are executed by one or more processors, the one or more processors implement a screen transmission processing method according to the fourth aspect.

In a fifteenth aspect, an embodiment of the present disclosure further provides a computer-readable storage medium, on which a computer program is stored, wherein when the program is executed by a processor, a screen transmission processing method according to any one of the first, second, third, fourth, or fifth aspect is implemented.

In an embodiment of the present disclosure, if it is determined that the screen transmission client has been installed in the target device and the screen transmission client is in the state to be updated, in response to the state to be updated, an update file of the screen transmission client is acquired from the target device, and the screen transmission client is updated according to the update file. On the one hand, by burning a program in the screen transmission device to acquire the update file of the screen transmission client from the target device and update it to the source device, instead of burning the screen transmission client itself in the screen transmission device, the volume of the screen transmission client is not limited to the storage space of the screen transmission device. And the storage space of the target device is generally much larger than the volume of the screen transmission client, thereby new functions of the screen transmission client can be continuously developed to ensure the performance of the screen transmission client. And when the screen transmission client is updated, it is sufficient to update the screen transmission client of the source device without burning the screen transmission client in the screen transmission device frequently, which greatly improves the simplicity of the update operation. On the other hand, the update of the screen transmission client does not affect the program, so that the function of the program is stable and the program does not need to be updated frequently, which ensures the simplicity of maintaining the screen transmission device.

BRIEF DESCRIPTION OF DRAWINGS

The accompanying drawings, which are incorporated herein and form a part of the specification, illustrate aspects of the present disclosure and, together with the description, further serve to explain the principles of the present disclosure and to enable a person skilled in the pertinent art to make and use the present disclosure.

DETAILED DESCRIPTION

Hereinafter, the present disclosure will be described in detail with reference to the drawings and embodiments. It can be understood that the embodiments described herein are only used to describe the present disclosure, but not to limit the present disclosure. In addition, it should be noted that, for ease of description, only a part of the structure related to the present disclosure is shown in the accompanying drawings, but not all of the structure.

Figure 1A:
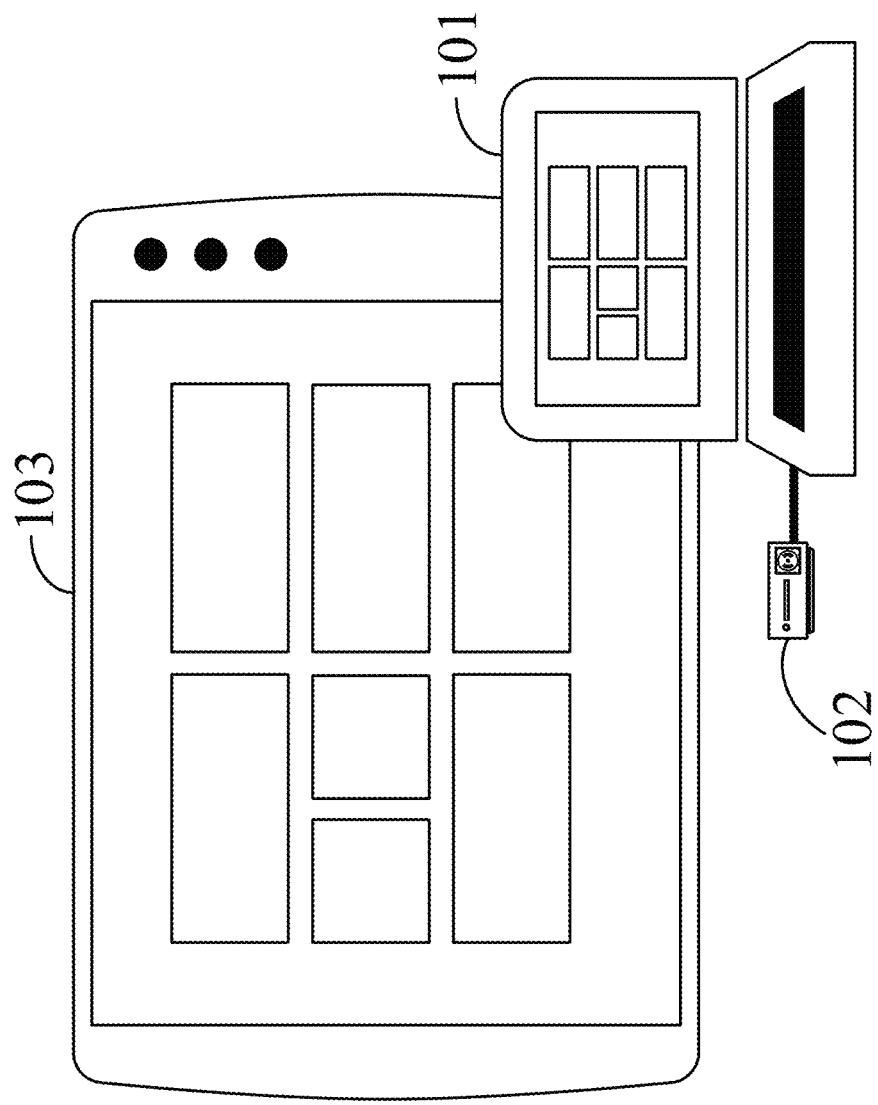
FIG. 1A is a schematic framework diagram of a screen transmission system according to some embodiments of the present disclosure.

FIG. 1A is a schematic framework diagram of a screen transmission system according to an embodiment of the present disclosure.

As shown in FIG. 1A, in the screen transmission system, a source device 110 is a device from which the screen transmission operations are performed, a screen transmission device 120 is a device that performs screen transmission operations, and a target device 130 is a device that is a destination of the screen transmission operation.

In general, the source device 110 has strong computing capabilities, and may include personal computers, laptop computers, etc., and its operating system may include windows, Mac, Android, iOS, etc., and the user can make and play a presentation document (PPT), a working document (Word) and other files in the source device 110.

However, the source device 110 has a small screen and low speaker power. For example, a notebook computer mostly has a screen of 13.3 inches, 14 inches, and 15.6 inches, and the speakers generally has a power of 2W-5W.

In conferences, lectures and other scenes, the venue is wide and the playback requirements are high. If files are played on the source device 110, problems such as small interface information (such as fonts, pictures, etc.) and low sound are likely to occur, resulting in poor playback effects.

The target device 130 may include a tablet, a display terminal, and so on.

The tablet can be composed of two or more physical entities, or can be composed of one physical entity. The tablet can control the content displayed on the tablet through touch technology, so as to realize human-computer interaction, and the tablet integrates one or more functions such as a projector, an electronic whiteboard, a screen, stereos, a TV, and a video conference terminal. In general, the display screen of a tablet can be a capacitive screen, a resistive screen or an electromagnetic screen. The user can perform touch operations on an interactive white board with a finger or a stylus.

The tablet is installed with applications that come with the operating system. Simultaneously, the tablet is also installed with applications downloaded from a third-party device or a server. Thereinto, a specific type and content of the application can be set according to the actual situation. Generally, the application software has a function of an electronic whiteboard, which can realize functions such as writing, drawing, annotation, courseware production, and display and playback through the function of the electronic whiteboard.

In one embodiment, the tablet may be a tablet suitable for conferences or a tablet suitable for education.

The so-called use suitable for conference or education can refer to the customization of corresponding applications in the tablet in accordance with the business characteristics of conferences or education.

For example, at the same time of writing on the screen of a tablet, other designs such as graphic aid are incorporated, which meets efficient writing needs in the conference.

The tablet has built-in modules such as camera, sound pickup, and amplification, which can support remote desktop sharing and real-time synchronization of remote writing, which meets the needs of remote collaboration and unbounded office in the conference.

The target device 130 has a large screen and high speaker power. For example, the screen of a tablet is usually 55-100 inches, and the power of the speaker is generally 30W-60W.

In scenes such as conferences and lectures, if a file is played on the target device 110, the interface information (such as fonts, pictures, etc.) is clear, the sound is loud, and the playback effect is better.

Therefore, multimedia data of the source device 110 can be synchronized to the target device 130 through the screen transmission device 120 for playback, which can combine the advantages of strong computing power of the source device 110 and better multimedia playback effect of the target device 130.

Figure 1B:
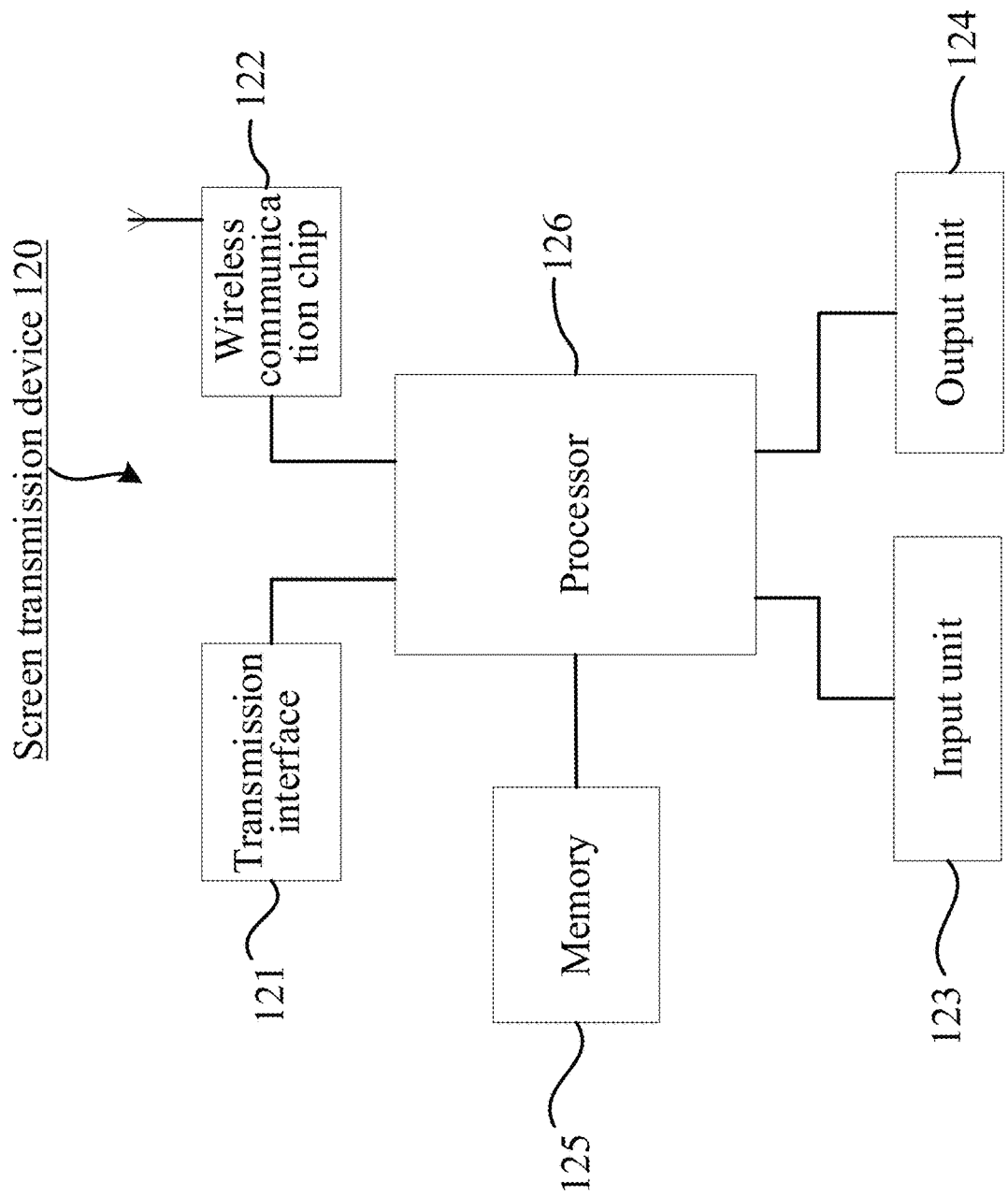
FIG. 1B is a schematic structure diagram of a screen transmission device according to some embodiments of the present disclosure.

FIG. 1B is a schematic structure diagram of a screen transmission device according to an embodiment of the present disclosure.

The screen transmission device 120 includes, but is not limited to, a transmission interface 121, a wireless communication chip 122, an input unit 123, an output unit 124, a memory 125, a processor 126 and other components. Those skilled in the art can understand that the structure of the screen transmission device 120 shown in FIG. 1B does not constitute a limitation on the screen transmission device 120. The screen transmission device 120 may include more or less components than those shown in the figure, or a combination of certain components, or different component arrangements. In the embodiment of the present disclosure, the screen transmission device 120 includes, but is not limited to, a USB Dongle (Universal Serial Bus Dongle) and the like.

The transmission interface 121 is an interface that uses the screen transmission device 120 as an external device to connect other devices, for example, a USB interface (including but not limited to Type A, Type B, Type C), etc. The transmission interface 121 can be configured to receive data from other devices, and input data into other devices.

It should be noted that the other device may be the source device 110 during a screen transmission operation, and may be the target device 130 during a pairing operation.

The so-called pairing may refer to authenticating the screen transmission device 120 by the target device 130, and writing information of a wireless access point of the target device 130 into the screen transmission device 120.

When the screen transmission device 120 connects the source device 110 through the transmission interface 121, data that can be received from the source device 110 includes but is not limited to screen data, audio data, etc., and data that can be transmitted to the source device 110 includes but is not limited to touch data, etc.

When the screen transmission device 120 connects the target device 130 through the transmission interface 121, data that can be received from the target device 130 includes but is not limited to pairing data, firmware, etc., and data that can be transmitted to the source device 110 includes but is not limited to pairing data, etc.

A wireless communication chip 122 can be used for wireless communication, including but not limited to Wi-Fi chips, Bluetooth chips, etc., wherein the Wi-Fi chip can be applied to 2.4G frequency band, 5G frequency band, etc., and the wireless communication chip 122 belongs to short-distance wireless transmission technology. After the screen transmission device 120 is paired with the target device 130, a wireless connection can be established with the target device 130 through the wireless communication chip 122, and the screen transmission device 120 can receive data (for example, touch data) from the target device 130 through the wireless connection, and input data (for example, screen data, audio data) into the target device 130.

The input unit 123 can be configured to generate key signal inputs related to user settings and function control. Specifically, the input unit 123 may include one or more of function keys (for example, a control for controlling the start of screen transmission, a control for controlling the pause of screen transmission, a control for controlling the stop of screen transmission), a touch panel, a joystick, and the like.

It should be noted that these function keys can be integrated into the same key, and different control functions can be distinguished by ways of pressing times, pressing duration, and pressing frequency.

The output unit 124 can be configured to output a state of the screen transmission, for example, the screen is being transferred, the screen is paused, and the screen is not transferred. In one embodiment, the output unit 124 includes an indicator light and the like.

The memory 125 can be configured to store software programs and various data. The memory 125 may mainly include a program storage area and a data storage area, wherein the program storage area may store application program (for example, pairing, transmission of screen data, audio data, touch data, and the like) required by at least one function, and the data storage area can store data (for example, pairing data, operation identification bits, and the like) created according to the use of the screen transmission device 120. In addition, the memory 125 may include a high-speed random access memory, and may further include a non-volatile memory, such as at least one magnetic disk storage device, a flash memory device, or other volatile solid-state storage devices.

Thereinto, the processor 126 is a control center of the screen transmission device 120, including but not limited to MPU (Micro Processor Unit), and uses various interfaces and lines to connect each part of the whole screen transmission device 120, and execute various functions of the screen transmission device 120 and process data by operating or executing software programs and/or modules stored in the memory 125 and calling data stored in the memory 125 screen transmission, so as to monitor the computer device as a whole.

Although not shown, the screen transmission device 120 may further include other components, such as a charging chip, etc., which will not be repeated herein.

The screen transmission client can be installed in the source device 110, and the screen transmission server can be installed in the target device 130. The screen transmission client and the screen transmission server follow a screen transmission protocol, and a screen transmission operation can be performed between the source device 110 and the target device 130 through the screen transmission device 120.

It should be noted that for different business scenarios, such as conferences, education, home entertainment, etc., the screen transmission protocol may be different, and the screen transmission operation will be different accordingly. Moreover, for the same business scenario, the screen transmission protocol may also be changed, and the screen transmission operation may also be different between the screen transmission client and the screen transmission server with different versions, which is not limited in the embodiment of the present disclosure.

In order to enable those skilled in the art to better understand the embodiments of the present disclosure, examples are used to illustrate the screen transmission operation in the embodiments of the present disclosure hereinafter.

1. The target device synchronizes multimedia data of the source device.

In the source device, the screen transmission client continuously performs a screenshot operation (i.e., a screen recording operation) to acquire screen data displayed by the source device, and acquire audio data played by the source device.

For example, in a windows system, the screen transmission client can take screenshots through GDI, mirror, ddraw, and dxgi.

The screen transmission client sends the screen data and the audio data to the screen transmission device.

The screen transmission device sends the screen data and the audio data to the target device.

In the target device, the screen transmission server displays the screen data and plays the audio data.

2. The source device synchronizes a touch operation of the target device.

In the target device, the screen transmission server monitors the touch data. The touch data includes at least one of, the number of touch points, a state of the touch point, coordinates of the touch point (including a horizontal axis coordinate x and a vertical axis coordinate y), and a pressure value of the touch point.

In one embodiment, the coordinates of the touch point are linearly zoomed according to the size of the display area of the screen data in the target device, so as to calculate and obtain the coordinates of the touch point.

The screen transmission server sends the touch data to the screen transmission device.

The screen transmission device sends the touch data to the source device.

In the source device, the screen transmission client performs operations corresponding to the touch data.

Or, in the target device, the screen transmission server monitors the touch data and converts the touch data into gesture signal.

The screen transmission server sends the gesture signal to the screen transmission device.

The screen transmission device sends the gesture signal to the source device.

In the source device, the screen transmission client performs an operation corresponding to the gesture signal.

In one case, the gesture signal can be used to trigger the source device to perform a specified operation, such as a page-turning operation, on a file with a preset type (such as PPT) displayed on the current interface.

In another case, the gesture signal is used to trigger the source device to perform an operation corresponding to the gesture signal in a manner of simulating key events of its operating system.

In another case, the screen transmission device acquires the key event corresponding to the gesture signal, and sends the key event to the source device through a keyboard protocol. The key event is used to trigger the source device to respond to the key event.

Embodiment 1

Figure 2:
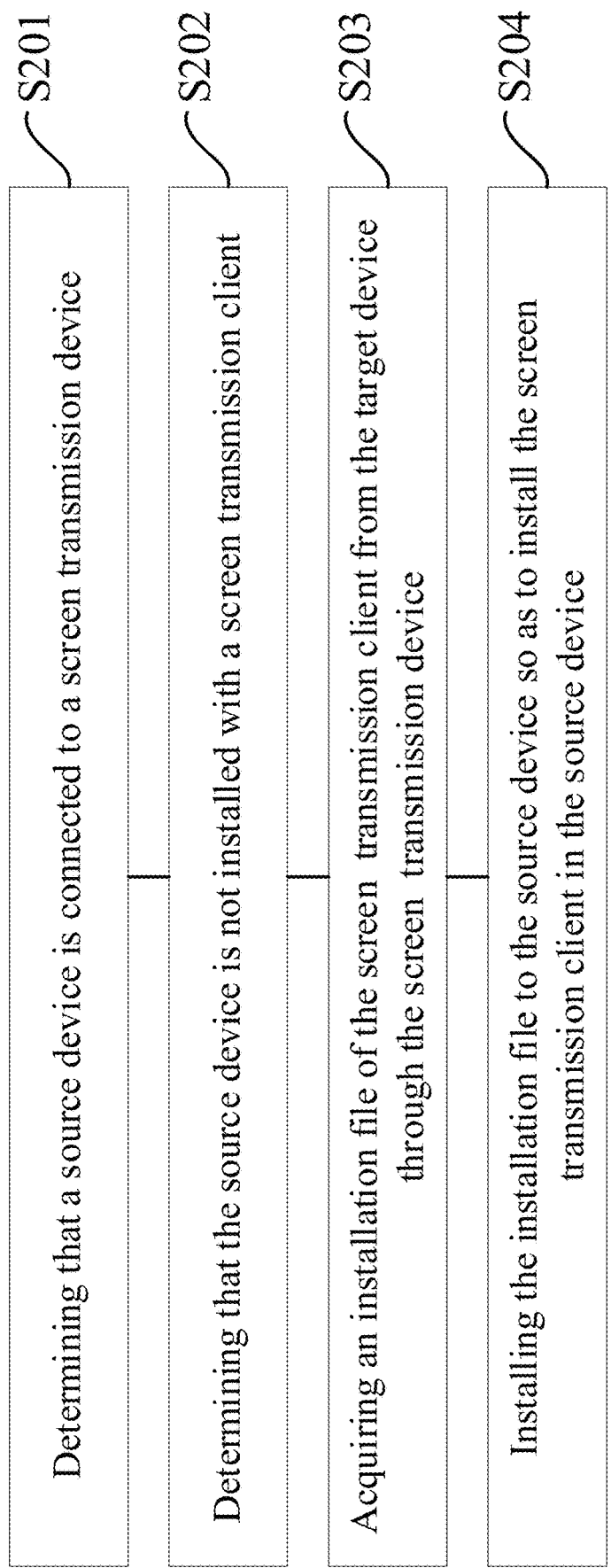
FIG. 2 is a flowchart of a screen transmission processing method according to Embodiment 1 of the present disclosure.

FIG. 2 is a flowchart of a screen transmission processing method according to Embodiment 1 of the present disclosure. This embodiment is applicable to a situation where a screen transmission client is installed in a source device. In this case, the screen transmission device is connected to the source device and is in a communication connection with the target device with which a pairing is completed, respectively. Specifically, on the one hand, the screen transmission device connects the source device through a transmission interface (such as USB interface). On the other hand, the screen transmission device is paired with the target device, and then the screen transmission device establishes a wireless connection (such as Wi-Fi connection) with the target device through a wireless communication chip (such as Wi-Fi chip). The method can be executed by a screen transmission processing device, which can be implemented by software and/or hardware, and can be arranged in an electronic device, such as a screen transmission device, a source device, etc. The method includes the following steps—

S201, determining that a source device is connected to a screen transmission device.

In the embodiment of the present disclosure, the screen transmission device can be paired with the target device in advance.

The so-called pairing can refer to mutually authenticating between the screen transmission device and the target device and recording the communication parameters of the other Party.

For the screen transmission device, the recordable communication parameters of the target device include a device address, such as IP (Internet Protocol, protocol for interconnection between networks) address, etc., and wireless access point information, such as SSID (Service Set Identifier) and a password.

The target device is used as a wireless access point, and the screen transmission device can connect the target device through communication parameter. After the communication connection, the screen transmission device can communicate with the target device.

In a pairing manner, the screen transmission device acquires and stores the communication parameters of the target device by connecting the target device to complete the pairing with the target device.

For example, the screen transmission device is connected to the target device through a transmission interface (such as USB interface). When authenticating the connected device as a screen transmission device, the target device writes its device communication parameters such as an address and wireless access point information into a memory of the screen transmission device.

Definitely, in addition to connecting the target device through the transmission interface for pairing, other manners can also be used for pairing, for example, NFC (Near Field Communication) is used for pairing, which is not limited in the embodiment of the present disclosure.

If the screen transmission device is connected to the target device through a transmission interface (such as USB interface) for pairing, after the pairing is successful, a user can unplug the target device, and thereafter, the screen transmission device is connected to the source device through the transmission interface (such as USB interface).

In the memory of the screen transmission device, a program is burned, which is named a loader. The loader can install the screen transmission client in the source device in accordance with the manner of steps S201-S204.

In the embodiment of the present disclosure, the loader has a function of communicating with the target device, but does not have a function of performing a screen transmission operation. Therefore, in general, the function of the loader is less than that of the screen transmission client, and the volume of the loader is smaller than that of the screen transmission client.

The screen transmission device is connected to the source device, and the screen transmission device is in a communication connection with the target device with which a pairing is completed. At the same time, the loader can be started. When the loader is started, it can be determined that the source device is connected to the screen transmission device.

S202, determining that the source device is not installed with a screen transmission client.

In the embodiment of the present disclosure, the screen transmission client is an independent client, or is a component in a certain client, which can be configured to perform the screen transmission operation between the source device and the target device through the screen transmission device, so that the target device displays screen projection interface data of the source device. The screen projection interface data includes screen data displayed by the source device, an operation control provided by the target device, and the like.

Since there are many types of operating systems for the source device, such as windows, Mac, Android, iOS, etc. In the memory of the screen transmission device, in order to be compatible with different types of operating systems, for different types of operating systems, a loader suitable for running the operating system is burned. When the screen transmission device is connected to the source device, the loader suitable for running in the operating system of the source device can be started.

In a startup manner, a detection service is registered in the source device in advance, and when determining that the screen transmission device is connected to the source device, the detection service starts the loader in the source device.

Definitely, the startup by the detection service mentioned above is just an example. When implementing the embodiment of the present disclosure, other startup manners can be set according to the actual situation. For example, in a windows system, a file automatically operated (autorun.inf) can be created in a root directory of the screen transmission device. The content of the file (such as open parameter) points to the loader, so that when the screen transmission device is connected to the source device, the component of the source device (such as AutoRun component) starts the loader in accordance with the parameters of the file, etc., which is not limited by the embodiment of the present disclosure. Moreover, in addition to the startup by the detected service mentioned above, those skilled in the art can also adopt other activation manners according to actual needs, which is not limited by the embodiment of the present disclosure.

In a specific implementation, the loader may not write a registry or rely on some dynamic libraries. All or part of the data can be read into an internal storage of the source device and run in the environment of the source device.

If part of the data is read into the internal storage of the source device, and the remaining part of the data is in the memory of the screen transmission device, when running this part of the data, the remaining part of the data of the loader is read from the memory of the screen transmission device, so as to ensure a normal running of the loader.

After the loader is started, it is possible to detect whether the screen transmission client is installed in the source device, so as to determine the installation state of the screen transmission client on the source device.

In one detection manner, the screen transmission client is configured with a description file (such as nfo file). The description file is used to record client parameters of the screen transmission client, and the client parameters include at least one of the following—check code (such as MD5 (the fifth version of Message Digest Algorithm) value), a file name of a program file, startup parameters of the program file, and version information of the program file.

In this detection manner, the description file can uniquely identify the screen transmission client, and the loader can acquire the file information of the screen transmission client written by the screen transmission device connected to the source device, and search for the description file in the source device according to the file information, so as to determine whether the screen transmission client is installed in the source device.

In one embodiment, the file information of the description file includes a specified file name, and the loader can detect whether a file with the file name is stored in the source device. If the file with the file name is not detected, it is determined that no description file is stored in the source device.

If the description file is not found, it is determined that the source device is not installed with the screen transmission client.

Definitely, the above detection manner is only an example. When implementing the embodiments of the present disclosure, other detection manners can be set according to the actual situation, for example, in the registry (in the windows system, the path is HKEY_CURRENT_USER\SOFTWARE\Microsoft\Windows\CurrentVersion\Uninstall, or, HKEY_LOCAL_MACHINE\SOFTWARE\Microsoft\Windows\CurrentVersion\Uninstall), whether there is a key value specific to the screen transmission client is detected, which is not limited in the embodiment of the present disclosure. Moreover, in addition to the above-mentioned judgment processing method, those skilled in the art can also adopt other detection manners according to actual needs, which is not limited in the embodiment of the present disclosure.

S203, acquiring an installation file of the screen transmission client from the target device through the screen transmission device.

In the embodiment of the present disclosure, the server that publishes the screen transmission client can push the installation file of the screen transmission client to the target device, and the target device stores the installation file in a specified directory.

There are many types of operating systems for the source device, such as windows, Mac, Android, iOS, etc. In order to be compatible with different types of operating systems, for different types of operating systems, the server can publish different types of installation files suitable for installation and running on the operating system, and push different types of installation files to the target device, and the target device stores the different types of installation files to the specified directory.

It should be noted that, in order to enhance the scalability of the screen transmission client and facilitate maintenance, part of the functions of the screen transmission client can be customized into plug-ins, that is, the screen transmission client includes a main program and a plug-in.

In an example, the installation file is an installation pack, which can be a collection of files that can be decompressed by itself, including all files (which can include main program and description file, or can include main program, plug-in, and description file) installed by the screen transmission client.

In another example, the installation file includes a program file and a description file, and the program file may run independently of registry, system settings, shortcuts, and the like.

For installation, the program file can be program files of the main program, or can be program files of the main program and the plug-in.

In this example, the program file may refer to a file to which the screen transmission client program itself belongs. In different types of operating systems, the forms of some program files are also different.

For example, in the windows system, the program file of the main program may be an executable file, such as an exe file, and the program file of a plug-in is a library file, such as a DLL (Dynamic Link Library) file.

In the Mac system, the program file of the main program is an executable file, and the program file of the plug-in is an executable file.

When determining that the source device is not installed with the screen transmission client, the loader can generate an installation request and send it to the screen transmission device through a transmission interface (such as USB interface). The screen transmission device sends the installation request to the target device through a wireless connection (such as Wi-Fi).

In response to the installation request, the target device can search for the installation file of the screen transmission client from the specified directory, and send the installation file to the screen transmission device through a wireless connection (such as Wi-Fi), and the screen transmission device sends the installation file to the loader through the transmission interface (such as USB interface).

There are many types of operating systems for the source device, such as windows, Mac, Android, iOS, etc. In order to be compatible with different types of operating systems, the loader can indicate the type of operating system by an indication bit in the installation request, the target device extracts the indication bit from the installation request, and find the installation file of the screen transmission client that matches the type indicated by the indication bit from the specified directory, so that the screen transmission client can be installed in and run by the source device.

S204, installing the installation file to the source device so as to install the screen transmission client in the source device.

After the installation file of the screen transmission client is acquired, the loader can install the installation file in the source device, and install the screen transmission client in the source device, so that the screen transmission operation is realized between the source device and the target device.

In an example, if the installation file is an installation pack, it is possible to run the installation pack, and release all the files (which can include the main program, the description file, or can include the main program, the plug-in, and the description file) of the screen transmission client to the installation directory of the source device, and complete the work such as modifying registry, modifying system settings, and creating shortcuts.

In another example, if the installation file includes a program file and a description file, the program file includes the program files of the main program, or the program files of the main program and the plug-in.

At this time, the program file can be stored in the specified installation directory in the source device, and the description file can be stored in the specified installation directory in the source device.

In one embodiment, if the program file is a compressed file, such as DAT file, when the program file is stored in the specified installation directory in the source device, the program file can be decompressed.

In the embodiment of the present disclosure, it is determined that the source device is connected to the screen transmission device, and the screen transmission device is in a communication connection with a target device with which a pairing is completed. If it is determined that the source device is not installed with the screen transmission client, the installation file of the screen transmission client can be acquired from the target device, and the installation file is installed to the source device so as to install the screen transmission client in the source device. By burning a program in the screen transmission device to acquire the installation file of the screen transmission client from the target device and install it to the source device, instead of burning the screen transmission client itself in the screen transmission device, the volume of the screen transmission client is not limited to the storage space of the screen transmission device. And the storage space of the target device is generally much larger than the volume of the screen transmission client, thereby new functions of the screen transmission client can be continuously developed to ensure the performance of the screen transmission client. Moreover, by the manner of connecting the screen transmission device and downloading the screen transmission client from the target device paired with the screen transmission device for installation, it is possible to ensure that the screen transmission client in the source device is consistent with the requirement of the target device, thereby ensuring the adaptation of the screen transmission operation between the source device and the target device, and reducing problems due to version compatibility.

Secondly, the description file is configured for the screen transmission client and the description file is searched for in the source device. If the description file is not found, it is determined that the source device is not installed with the screen transmission client. In addition to recording the client parameters of the screen transmission client, the description file can also be reused as an identification of whether the screen transmission client has been installed, which is easy to operate and short in detection time.

Furthermore, the installation file includes a program file and a description file. The program file is stored in the specified installation directory in the source device, and the description file is stored in the specified installation directory in the source device, which can be realize the installation of the screen transmission client without modifying settings such as registry, system settings, and shortcuts, thereby reducing the probability of being intercepted by the security application as a risky operation, and ensuring the success rate of installing the screen transmission client, so that the screen transmission client can run normally, thereby ensuring the stability of the screen transmission.

Embodiment 2

Figure 3:
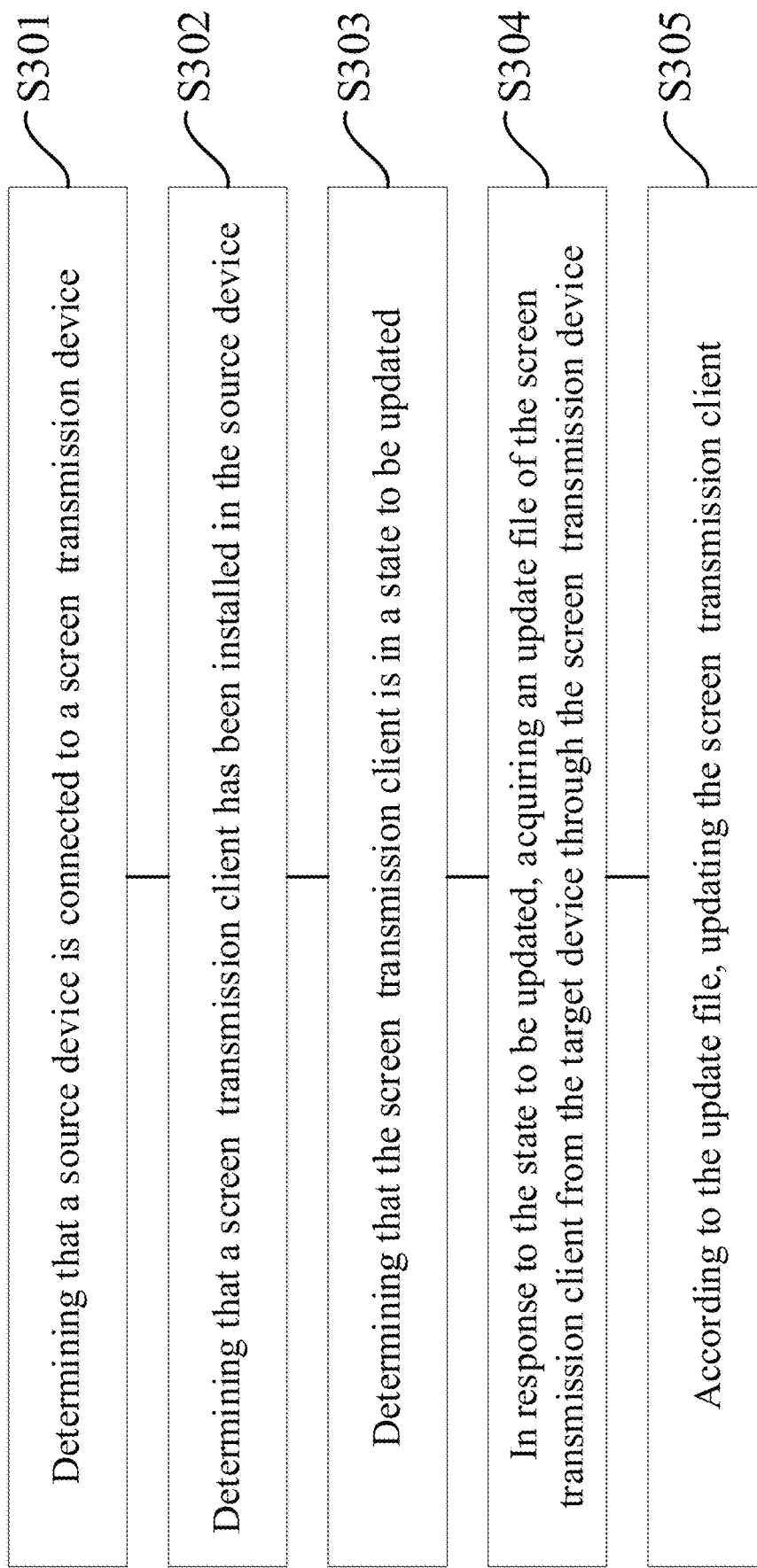
FIG. 3 is a flowchart of a screen transmission processing method according to Embodiment 2 of the present disclosure.

FIG. 3 is a flowchart of a screen transmission processing method according to Embodiment 2 of the present disclosure. This embodiment is applicable to the case where the source device updates the screen transmission client. In this case, the screen transmission device is connected to the source device and is in a communication connection with a target device with which a pairing is completed, respectively. Specifically, on the one hand, the screen transmission device is connected to the source device through a transmission interface (such as USB interface). On the other hand, the screen transmission device is paired with the target device, and then the screen transmission device establishes a wireless connection (such as Wi-Fi connection) with the target device through a wireless communication chip (such as Wi-Fi chip). The method can be executed by a screen transmission processing device, which can be implemented by software and/or hardware, and can be arranged in an electronic device, such as a screen transmission device, a source device, etc. The method includes the following steps—

S301, determining that a source device is connected to a screen transmission device.

In the memory of the screen transmission device, a program is burned, which is named a loader. The loader can update the screen transmission client in the source device in accordance with the manner of steps S301-S304.

The processing procedure of determining that the source device is connected to the screen transmission device in step S301 is the same as step S201 in Embodiment 1, and will not be repeated herein.

S302, determining that a screen transmission client has been installed in the source device.

In one embodiment, the file information of the description file includes a specified file name, and the loader can detect whether the file with the file name is stored in the source device. If the file with the file name is detected, it is determined that the description file is stored in the source device.

If the description file is found, it is determined that the screen transmission client is installed in the source device.

Reference of the processing procedure of determining that the screen transmission client has been installed in the source device in step S302 is made to step S202 in Embodiment 1, which will not be repeated herein.

S303, determining that the screen transmission client is in a state to be updated.

In the embodiment of the present disclosure, the server that publishes the screen transmission client can push the update file of the screen transmission client to the target device, and the target device stores the update file in a specified directory.

There are many types of operating systems for the source device, such as windows, Mac, Android, iOS, etc. In order to be compatible with different types of operating systems, for different types of operating systems, the server can publish different types of update files suitable for installation and running on the operating system aiming, and push different types of update files to the target device, and the target device stores the different types of update files to the specified directory.

It should be noted that, in order to enhance the scalability of the screen transmission client and facilitate maintenance, part of the functions of the screen transmission client can be customized as plug-ins, that is, the screen transmission client includes a main program and a plug-in.

In an example, the update file is an update pack.

In this example, the update file can be an installation pack of the screen transmission client with the new version, which can be a collection of files that can be decompressed by itself, including all files (which can include main program and description file, or can include main program, plug-in, and description file) installed by the screen transmission client.

The update pack may also be a differential pack, and the differential pack includes the difference between the screen transmission client with the new version and the screen transmission client with the old version.

In another example, the update file includes a program file and a description file, and the program file may run independently of registry, system settings, shortcuts, and the like.

For update, the program file can be program files of the main program, or can be program files of the main program and the plug-in.

In this example, the program file may refer to a file to which the screen transmission client program itself belongs. In different types of operating systems, the forms of some program files are also different.

For example, in the windows system, the program file of the main program may be an executable file, such as an exe file, and the program file of a plug-in is a library file, such as a DLL file.

In the Mac system, the program file of the main program is an executable file, and the program file of the plug-in is an executable file.

When determining that the source device is installed with the screen transmission client, the loader can detect whether the screen transmission client is in a state to be updated or in a runnable state, so as to determine the installation state of the screen transmission client on the source device. If the screen transmission client does not meet the requirements of the screen transmission operation, it is possible to determine that the screen transmission client is in a state to be updated.

In general, the update can refer to the version upgrade, and in some cases, the update can also refer to the version rollback. For example, the screen transmission client with a new version has serious vulnerabilities and the vulnerabilities has not yet been fixed. The normal execution of the screen transmission operation can be guaranteed through the version rollback. Or, the screen transmission client with the new version has a compatibility problem with the source device and the compatibility problem has not been fixed yet, the normal execution of the screen transmission operation can be guaranteed through the version rollback, and the like.

In a manner of determining the state to be updated, the screen transmission client has a program file and a description file. The description file is used to record client parameters of the screen transmission client, and the client parameters include version information of the program file.

On the one hand, the loader reads the version information of the program file from the description file as the first version.

On the other hand, the loader acquires the version information of the program file from the target device as the second version.

In one embodiment, the loader may generate a version query request and send it to the screen transmission device through a transmission interface (such as USB interface), and the screen transmission device sends the version query request to the target device through a wireless connection (such as Wi-Fi).

In response to the version query request, the target device can read the version information of the program file from the description file in the specified directory, and send the version information of the program file to the screen transmission device through a wireless connection (such as Wi-Fi). The screen transmission device sends the version information of the program file to the loader through a transmission interface (such as USB interface).

The loader compares the first version with the second version, and if the first version is different from the second version, it is determined that the screen transmission client is in a state to be updated, that is, to be updated to the second version.

It should be noted that the screen transmission client may have at least two program files, and the loader compares the versions of the program files one by one so as to determine whether the program file needs to be updated.

In the embodiment of the present disclosure, the version information of the program file is read from the description file as the first version, and the version information of the program file is acquired from the target device as the second version. If the first version is different from the second version, it is determined that the screen transmission client is in a state to be updated, and the second version is the version required by the target device. Whether the screen transmission client needs to be updated is determined based on whether the first version and the second version are consistent, so that the screen transmission client in the source device is consistent with the requirement of the target device, so as to ensure the adaptation of the screen transmission operation between the source device and the target device, and reduce problems due to version compatibility.

Definitely, the above manner of determining the state to be updated is just an example. When implementing the embodiment of the present disclosure, other manners of determining the state to be updated can be set according to the actual situation. For example, in the windows system, the loader uses the -version command in powershell or cmd to detect the version information of the screen transmission client as the first version, and compare it with the second version of the target device. Or, the loader sends the first version of the screen transmission client to the target device, screen transmission the target device compares the first version with the second version, and determines that the screen transmission client is in a state to be updated, and notifies the loader, etc., which is not limited in the embodiment of the present disclosure. Moreover, in addition to the above-mentioned manner of determining the state to be updated, those skilled in the art may also adopt other manners of determining the state to be updated according to actual needs, which is not limited in the embodiment of the present disclosure.

S304, in response to the state to be updated, acquiring an update file of the screen transmission client from the target device through the screen transmission device.

When determining that the screen transmission client is in a state to be updated, the loader can generate an update request and send it to the screen transmission device through a transmission interface (such as USB interface), and the screen transmission device sends the update request to the target device through a wireless connection (such as Wi-Fi).

In response to the update request, the target device can search for the update file of the screen transmission client from the specified directory, and send the update file to the screen transmission device through a wireless connection (such as Wi-Fi), and the screen transmission device sends the update file to the loader through the transmission interface (such as USB interface).

There are many types of operating systems for the source device, such as windows, Mac, Android, iOS, etc. In order to be compatible with different types of operating systems, the loader can indicate the type of operating system by an indication bit in the update request, the target device extracts the indication bit from the update request, and find the update file of the screen transmission client that matches the type indicated by the indication bit from the specified directory, so that the updated screen transmission client can be run by the source device.

S305, according to the update file, updating the screen transmission client.

After acquiring the update file of the screen transmission client, the loader can use the update file in the source device to update the screen transmission client, so that the screen transmission operation is realized between the source device and the target device.

In an example, if the update file is an update pack, the update pack can be run to automatically update the screen transmission client.

In this example, if the update pack is an installation pack of the screen transmission client with the new version, it is possible to run the installation pack to release all the files (which can include main programs, description files, or can include main programs, plug-ins, description files) of the screen transmission client to the installation directory of the source device, and complete the work such as modifying registry, modifying system settings, and creating shortcuts.

If the update pack is a differential pack, it is possible to run the differential pack, copy the screen transmission client with the old version to a cache, and combine the screen transmission client with the old version and the differential pack to obtain the screen transmission client with the new version.

In another example, the update file includes a program file and a description file, and the program file may run independently of registry, system settings, shortcuts, and the like.

In this example, the loader can determine the installation directory, which is used to store the program files and description files of the screen transmission client.

On the one hand, the program file in the installation directory is replaced with the program file in the update file to realize the update of the program file.

On the other hand, the description file in the installation directory is replaced with the description file in the update file, so that the description file is consistent with the program file.

In the embodiment of the present disclosure, it is determined that the source device is connected to the screen transmission device, and the screen transmission device is in a communication connection with a target device with which a pairing is completed. If it is determined that the screen transmission client has been installed in the source device and the screen transmission client is in a state to be updated, in response to the state to be updated, it acquires an update file of the screen transmission client from the target device, and according to the update file, updates the screen transmission client. On the one hand, by burning a program in the screen transmission device to acquire the update file of the screen transmission client from the target device and update it to the source device, instead of burning the screen transmission client itself in the screen transmission device, the volume of the screen transmission client is not limited to the storage space of the screen transmission device. And the storage space of the target device is generally much larger than the volume of the screen transmission client, thereby new functions of the screen transmission client can be continuously developed to ensure the performance of the screen transmission client. Moreover, when the screen transmission client is updated, it is sufficient to update the screen transmission client of the source device without frequently burning the screen transmission client in the screen transmission device, which greatly improves the simplicity of the update operation. On the other hand, the update of the screen transmission client does not affect the program, so that the function of the program is stable and the program does not need to be updated frequently, which ensures the simplicity of maintaining the screen transmission device. Moreover, by the manner of connecting the screen transmission device and downloading the screen transmission client from the target device that is paired with the screen transmission device for updating, it is possible to ensure that the screen transmission client in the source device is consistent with the requirement of the target device, thereby ensuring the adaptation of the screen transmission operation between the source device and the target device, and reducing problems due to version compatibility.

Secondly, the description file is configured for the screen transmission client and the description file is searched for in the source device. If the description file is found, it is determined that the screen transmission client has been installed in the source device. In addition to recording the client parameters of the screen transmission client, the description file can also be reused as the identification of whether to install the screen transmission client, which is easy to operate and short in detection time.

Furthermore, the update files include a program file and a description file. The screen transmission client is updated by replacing the program file and the description file, which can be realize the update of the screen transmission client without modifying settings such as registry, system settings, and shortcuts, thereby reducing the probability of being intercepted by the security application as a risky operation, and ensuring the success rate of updating the screen transmission client, so that the screen transmission client can run normally, thereby ensuring the stability of the screen transmission.

Embodiment 3

Figure 4:
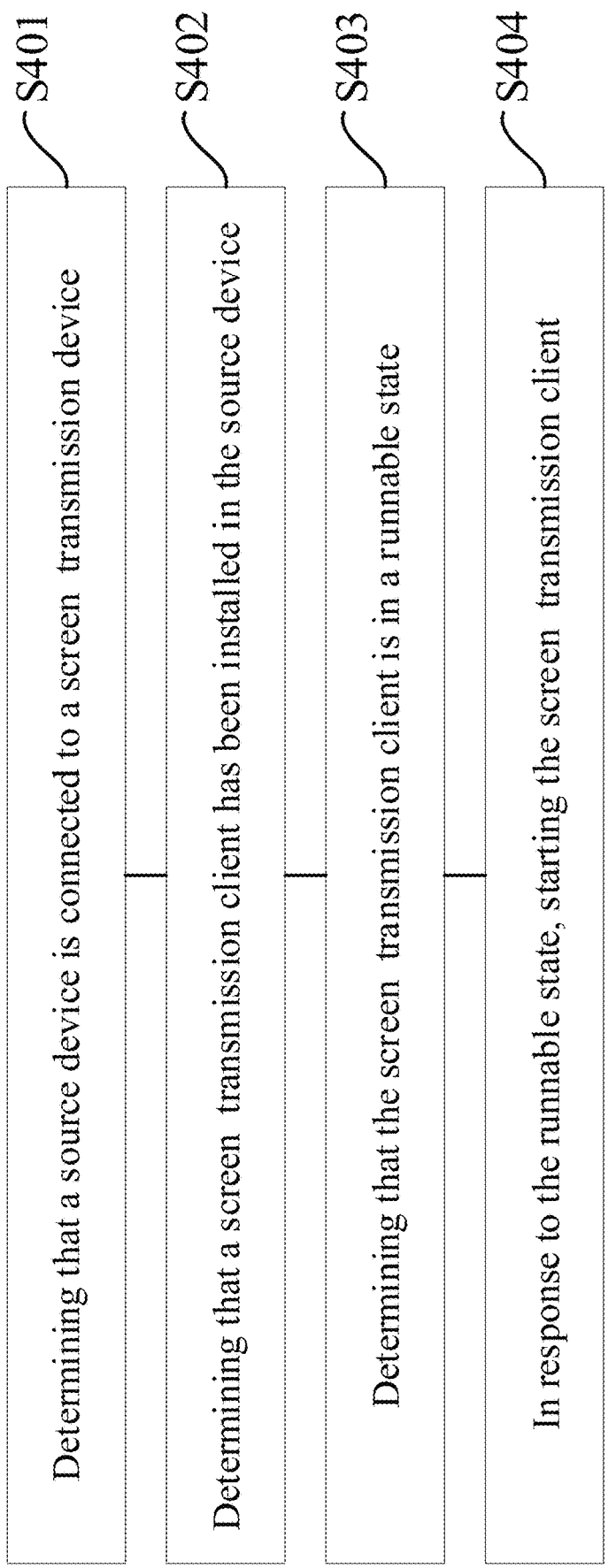
FIG. 4 is a flowchart of a screen transmission processing method according to Embodiment 3 of the present disclosure.

FIG. 4 is a flowchart of a screen transmission processing method according to Embodiment 3 of the present disclosure. On the basis of the above-mentioned Embodiment 2, this embodiment adds an operation of starting the screen transmission processing. The method includes the following steps—

S401, determining that a source device is connected to a screen transmission device.

In the embodiment of the present disclosure, the screen transmission device is configured to be in a communication connection with a target device with which a pairing is completed, S402, determining that a screen transmission client has been installed in the source device.

Thereinto, the screen transmission client is configured to perform a screen transmission operation between the source device and the target device through the screen transmission device.

S403, determining that the screen transmission client is in a runnable state.

When determining that the screen transmission client is installed in the source device, a loader detect the state of the screen transmission client. If the screen transmission client meets the requirements of the screen transmission operation, it is possible to determine that the screen transmission client is in a runnable state.

In a manner of determining the runnable state, the screen transmission client has a program file and a description file. The description file is used to record client parameters of the screen transmission client, and the client parameters include version information of the program file.

On the one hand, the loader reads the version information of the program file from the description file as the first version.

On the other hand, the loader acquires the version information of the program file from the target device as the second version.

Specifically, the loader can generate a version query request and send it to the screen transmission device through a transmission interface (such as USB interface), and the screen transmission device sends the version query request to the target device through a wireless connection (such as Wi-Fi).

In response to the version query request, the target device can read the version information of the program file from the description file in the specified directory, and send the version information of the program file to the screen transmission device through a wireless connection (such as Wi-Fi). The screen transmission device sends the version information of the program file to the loader through a transmission interface (such as USB interface).

The loader compares the first version with the second version, and if the first version is the same as the second version, it is determined that the screen transmission client is in the runnable state.

It should be noted that the screen transmission client may have at least two program files, and the loader compares the versions of the program files one by one. If it is determined that the versions of all the program files do not need to be updated, it is possible to confirm that the screen transmission client is in the runnable state.

Definitely, the above manner of determining the runnable state is just an example. When implementing the embodiment of the present disclosure, other manners of determining the runnable state can be set according to the actual situation. For example, in the windows system, the loader uses the -version command in powershell or cmd to detect the version information of the screen transmission client as the first version, and compare it with the second version of the target device. Or, the loader sends the first version of the screen transmission client to the target device, and the target device compares the first version with the second version, determines that the screen transmission client is in a runnable state, and notifies the loader, etc., which is not limited in the embodiment of the present disclosure. Moreover, in addition to the above-mentioned manner of determining the runnable state, those skilled in the art may also adopt other manners of determining the runnable state according to actual needs, which is not limited in the embodiment of the present disclosure.

S404, in response to the runnable state, starting the screen transmission client.

After it is determined that the screen transmission client can be runnable, the loader can start the screen transmission client in the source device, and the screen transmission client runs in the environment of the source device, so that the screen transmission operation can be realized between the source device and the target device.

In one startup manner, the screen transmission client has a program file and a description file. The description file is used to record the client parameters of the screen transmission client, and the client parameters include the startup parameters of the program file.

In response to the runnable state, the loader can read the startup parameters of the program file from the description file, and start the program file in accordance with the startup parameters.

For example, in the windows system, functions such as WinExec and ShellExecute createprocessasuse can be called, and when the program file is started, the startup parameters are added to the program file.

In the embodiment of the present disclosure, if it is determined that the screen transmission client has been installed in the target device and the screen transmission client is in a runnable state, the screen transmission client is started in response to the runnable state. By checking whether the screen transmission client is installed and whether the screen transmission client need to be updated, the screen transmission client can be started only when the relevant conditions are met to ensure the stability of the screen transmission client operation.

Secondly, the version information of the program file is read from the description file as the first version, the version information of the program file is acquired from the target device as the second version. If the first version is the same as the second version, it is determined that the screen transmission client is in a runnable state, and the second version is a version required by the target device. Whether the first version is consistent with the second version is used to judge whether the screen transmission client is runnable, so that the screen transmission client in the source device is consistent with the requirement of the target device, thereby ensuring the adaptation of the screen transmission operation between the source device and the target device, and reducing the problems due to version compatibility.

Furthermore, the startup parameters of the program file are read from the description file, and the program file is started in accordance with the startup parameters, which can improve the scalability of the program file and ensure the normal startup of the program file.

Embodiment 4

Figure 5:
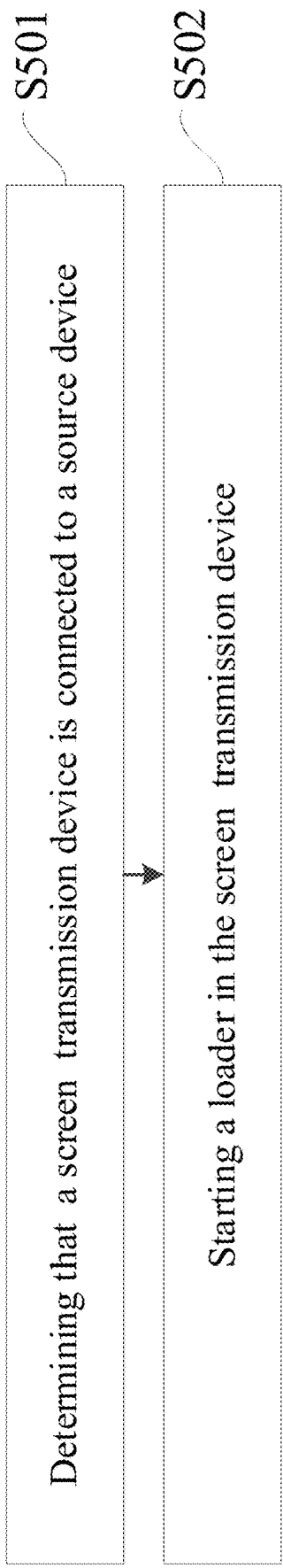
FIG. 5 is a flowchart of a screen transmission processing method according to Embodiment 4 of the present disclosure.

FIG. 5 is a flowchart of a screen transmission processing method according to Embodiment 4 of the present disclosure. This embodiment can be applied to a situation where the loader is started in the source device and the loader installs or updates the screen transmission client. The method can be executed by a processing device, which can be implemented by software and/or hardware, and can be configured in an electronic device, such as a source device, etc. The method includes the following steps—

S501, determining that a screen transmission device is connected to a source device.

In the embodiment of the present disclosure, the detection service program can be written into a registry of the source device through RegCreateKeyEx and RegSetKeyValue in advance, so that the detection service becomes a startup item and monitors whether the screen transmission device is connected to the source device.

Since there are many types of operating systems for the source device, such as windows, Mac, Android, iOS, etc., in order to be compatible with different types of operating systems, detection services suitable for running on the operating systems can be registered for different types of operating systems.

In a registration manner, the detection service is burned in the screen transmission device in advance. When the screen transmission device is connected to the target device for the first time, the user manually starts the detection service in the screen transmission device, and the detection service is registered in the source device.

Definitely, in addition to registering the detection service through the screen transmission device, other manners can also be used to register the detection service, for example, starting a client such as a browser in the source device, downloading the detection service from the server that publishes the detection service, and registering it in the screen transmission device, etc., which is not limited in the embodiment of the present disclosure.

In a manner of determining the connection of the screen transmission device, the screen transmission device can be preset with a configuration file (such as config file), in which the file name (character string) of the loader is written.

In this manner, the detection service can monitor whether a transmission interface (such as USB interface) connects an external device.

A USB interface is taken as an example. When an external device is inserted into the USB interface, the windows system generates a global message WM_DEVICECHANGE. The monitoring service can view a wParam parameter of the global message WM_DEVICECHANGE. If it is DBT_DEVICEARRIVAL, it means that an external device is inserted and available. Then, the lParam parameter of the global message WM_DEVICECHANGE is viewed. If it is DBT_DEVTYP_VOLUME, the volume number dbcv_unitmask of the DEV_BROADCAST_VOLUME structure can be taken out, so as to know which volume is inserted.

The detection service determines that the external device is connected to the source device. Thereafter, it is possible to detect whether the specified configuration file is stored in the external device.

In one embodiment, the configuration file has a specified file name, such as "uwstconfig". The loader can detect whether a file with the file name is stored in the source device. If a file with the file name is detected, it is determined that the there is a configuration file in the source device.

If it is determined that there is a specified configuration file in the external device, it is determined that the external device is a screen transmission device.

If it is determined that there is no specified configuration file in the external device, it is determined that the external device is not a screen transmission device.

Definitely, the above manner of determining the connection of the screen transmission device is just an example. When implementing the embodiment of the present disclosure, other manners of determining the connection of the screen transmission device can be set according to the actual situation. For example, for the Type C interface, it can determine whether the screen transmission device is connected to the source device according to a level signal, or whether it is a screen transmission device according to the name of the external device, and the like, which is not limited in the embodiment of the present disclosure. Moreover, in addition to the above-mentioned manner of determining the connection of the screen transmission device, those skilled in the art may also adopt other manners of determining the connection of the screen transmission device according to actual needs, which is not limited in the embodiment of the present disclosure.

In addition, the screen transmission device can be configured to be in a communication connection with a target device with which a pairing is completed through a wireless connection (such as Wi-Fi connection).

S502, starting a loader in the screen transmission device.

In the memory of the screen transmission device, a program is burned, which is named a loader.

In the embodiment of the present disclosure, the loader has a function of communicating with the target device, but does not have a function of performing a screen transmission operation. Therefore, in general, the function of the loader is less than that of the screen transmission client. The volume of the loader is smaller than that of the screen transmission client.

When the detection service determines that the screen transmission device is connected to the source device, the loader in the screen transmission device can be started.

Since there are many types of operating systems for the source device, such as windows, Mac, Android, iOS, etc. In the memory of the screen transmission device, in order to be compatible with different types of operating systems, it is possible to, for different types of operating systems, start a loader suitable for running the operating system. When the screen transmission device is connected to the source device, the loader suitable for running in the operating system of the source device can be started.

In a startup manner, screen transmission a configuration file (such as config file) can be set in the screen transmission device in advance, and the file name (character string) of the loader is written into the configuration file.

In this manner, the specified character string can be read from the configuration file in the screen transmission device, and the loader whose name is the character string in the screen transmission device can be started.

Definitely, in addition to starting the loader through the configuration file, the loader can also be started by other manners, which is not limited in the embodiment of the present disclosure. For example, in the screen transmission device, the loader is stored in a specified directory, when the detection service finds the directory, the loader located in the directory is started.

In the embodiment of the present disclosure, the loader is configured to determine the installation state of the screen transmission client on the source device, and according to the installation state of the screen transmission client on the source device, acquire an installation file or an update file from the target device, and send the installation file or the update file to the source device, so that the source device installs or updates the screen transmission client, and the screen transmission client is configured to perform a screen transmission operation between the source device and the target device through the screen transmission device, so that the target device displays screen projection interface data of the source device. The screen projection interface data includes screen data displayed by the source device, an operation control provided by the target device, and the like.

In a specific implementation, the loader can determine the installation state of the screen transmission client on the source device in the following manner—acquiring file information of the screen transmission client written by the screen transmission device to which the source device is connected, according to the file information, searching for a description file in the source device, wherein the description file is used to record a client parameter of the screen transmission client, if the description file is found, determining that the screen transmission client has been installed in the source device, and determining that the screen transmission client is in a state to be updated or a runnable state, and if the description file is not found, determining that the screen transmission client is not installed in the source device.

In one embodiment, the screen transmission client has a program file and a description file. The description file is used to record a client parameter of the screen transmission client, and the client parameter include version information of the program file.

In one embodiment, determining that the screen transmission client is in the state to be updated or a runnable state includes—reading the version information of the program file from the description file as a first version, acquiring the version information of the program file from the target device through the screen transmission device as a second version, if the first version is different from the second version, determining that the screen transmission client is in the state to be updated, and if the first version is the same as the second version, determining that the screen transmission client is in the runnable state.

In a specific implementation, the loader can install the screen transmission client in the source device by the following manner—acquiring an installation file of the screen transmission client from the target device through the screen transmission device, and installing the installation file to the source device so as to install the screen transmission client in the source device.

In one embodiment, the installation file has a program file and a description file.

Installing the installation file to the source device includes—storing the program file to a specified installation directory in the source device, and storing the description file to a specified installation directory in the source device.

In the embodiment of the present disclosure, since the installation of the screen transmission client is basically similar to the application of Embodiment 1, the description is relatively simple. For the relevant parts, reference is made to the part of the description of Embodiment 1, which will not be described by the embodiment of the present disclosure in detail herein.

In actual application implementation, the loader can update the screen transmission client in the source device by the following manner—in response to the state to be updated, acquiring an update file of the screen transmission client from the target device through the screen transmission device, and according to the update file, updating the screen transmission client.

In one embodiment, the screen transmission client includes a program file and a description file.

According to the update file, updating the screen transmission client includes—determining an installation directory, wherein the installation directory is used to store the program file and the description file of the screen transmission client, replacing a program file in the installation directory with the program file in the update file, and replacing a description file in the installation directory with the description file in the update file.

In one embodiment, after the step of determining that a screen transmission client has been installed in the source device, the method further includes—in response to the runnable state, starting the screen transmission client.

In one embodiment, the screen transmission client has a program file and a description file, and the description file is used to record a client parameter of the screen transmission client, and the client parameter include a startup parameter of the program file.

Starting the screen transmission client in response to the runnable state includes—in response to the runnable state, reading the startup parameter of the program file from the description file, and in accordance with the startup parameter, starting the program file.

In the embodiment of the present disclosure, since the update of the screen transmission client is basically similar to the application of Embodiments 2 and 3, the description is relatively simple. For the relevant parts, reference is made to the part of the description of Embodiments 2 and 3, which will not be described by the embodiment of the present disclosure in detail herein.

In the embodiment of the present disclosure, if it is determined that the source device is connected to the screen transmission device, the loader in the screen transmission device is started, and the operation of the loader is triggered by monitoring the connection operation without manually starting the loader by a user, which can improve the simplicity of the screen transmission operation. In addition, by burning a loader in the screen transmission device to install or update the screen transmission client on the source device, instead of burning the screen transmission client itself in the screen transmission device, the volume of the screen transmission client is not limited to the storage space of the screen transmission device. And the storage space of the target device is generally much larger than the volume of the screen transmission client, thereby new functions of the screen transmission client can be continuously developed to ensure the performance of the screen transmission client. Moreover, when the screen transmission client is updated, it is sufficient to update the screen transmission client of the source device without frequently burning the screen transmission client in the screen transmission device, which greatly improves the simplicity of the update operation. The update of the screen transmission client does not affect the loader, so that the function of the program is stable and the program does not need to be updated frequently, which ensures the maintainability for the simplicity of the screen transmission device. Moreover, by the manner of connecting the screen transmission device and downloading the screen transmission client from the target device that is paired with the screen transmission device for installation or updating, it is possible to ensure that the screen transmission client in the source device is consistent with the requirement of the target device, thereby ensuring the adaptation between the source device and the target device, and reducing problems due to version compatibility.

Secondly, the configuration file is set for the screen transmission device. If it is determined that the external device is connected to the source device and the external device has the specified configuration file, it is determined that the external device is the screen transmission device, which is easy to operate and short in detection time.

Furthermore, the specified character string is read from the configuration file of the screen transmission device, and the loader named with the character string in the screen transmission device is started, which is easy to operate and can quickly start the loader, and the configuration file can be used for identifying the screen transmission device and at the same time instructing to start the loader, which saves resources.

Embodiment 5

Figure 6:
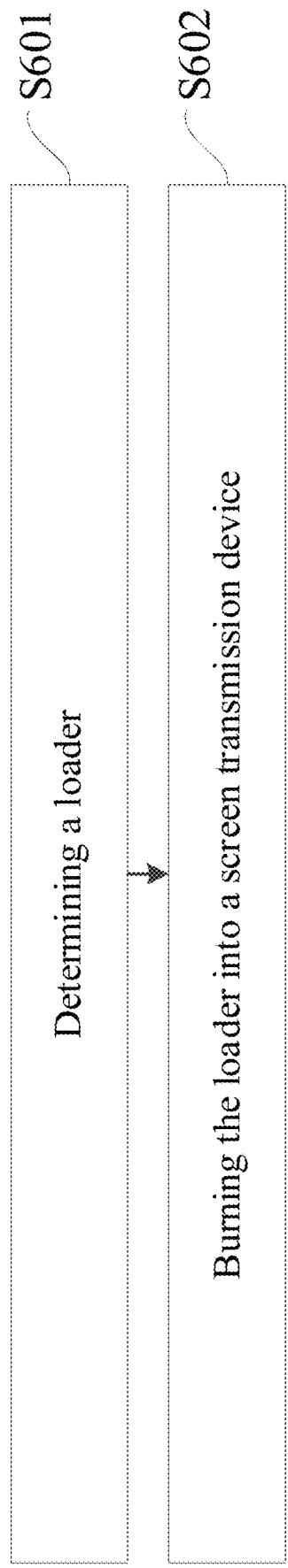
FIG. 6 is a flowchart of a screen transmission processing method according to Embodiment 5 of the present disclosure.

FIG. 6 is a flowchart of a screen transmission processing method according to Embodiment 5 of the present disclosure. This embodiment can be applied to a situation where a loader is burned in a screen transmission device. The method can be executed by a screen transmission processing device. The screen processing device can be implemented by software and/or hardware, and can be configured in an electronic device, such as a target device, a personal computer, etc. The method includes the following steps—

S601, determining a loader, and

S602, burning the loader into a screen transmission device.

In the embodiment of the present disclosure, the screen transmission device can be configured to connect a source device and be in a communication connection with a target device with which a pairing is completed, respectively. Specifically, on the one hand, the screen transmission device connects the source device through a transmission interface (such as USB interface). On the other hand, the screen transmission device establishes a wireless connection (such as Wi-Fi connection) with the target device through a wireless communication chip (such as Wi-Fi chip).

When the screen transmission device is connected to the target device or other device (such as personal computer), the loader can be burned to the memory in the screen transmission device.

In an embodiment, determining that the source device is not installed with a screen transmission client includes— searching for a description file in the source device, the description file is used to record a client parameter of the screen transmission client, and if the description file is not found, determining that the source device has not been installed with the screen transmission client.

In the embodiment of the present disclosure, since the installation of the screen transmission client is basically similar to the application of Embodiment 1, the description is relatively simple. For the relevant parts, reference is made to the part of the description of Embodiment 1, which will not be described by the embodiment of the present disclosure in detail herein.

For the processing procedure of burning the loader into the screen transmission device in step S602, reference is made to step S502 in Embodiment 4, which will not be repeated herein.

In the embodiment of the present disclosure, since the update of the screen transmission client is basically similar to the application of Embodiments 2 and 3, the description is relatively simple. For the relevant parts, reference is made to the part of the description of Embodiments 2 and 3, which will not be described by the embodiment of the present disclosure in detail herein.

In the embodiment of the present disclosure, the loader is burned in the screen transmission device to install or update the screen transmission client on the source device, instead of burning the screen transmission client itself in the screen transmission device, the volume of the screen transmission client is not limited to the storage space of the screen transmission device. And the storage space of the target device is generally much larger than the volume of the screen transmission client, thereby new functions of the screen transmission client can be continuously developed to ensure the performance of the screen transmission client. Moreover, when the screen transmission client is updated, it is sufficient to update the screen transmission client of the source device without frequently burning the screen transmission client in the screen transmission device, which greatly improves the simplicity of the update operation. The update of the screen transmission client does not affect the loader, so that the function of the loader is stable and the loader does not need to be updated frequently, which ensures the maintainability for the simplicity of the screen transmission device. Moreover, by the manner of connecting the screen transmission device and downloading the screen transmission client from the target device that is paired with the screen transmission device for installation or updating, it is possible to ensure that the screen transmission client in the source device is consistent with the requirement of the target device, thereby ensuring the adaptation of the screen transmission operation between the source device and the target device, and reducing problems due to version compatibility.

Embodiment 6

Figure 7:
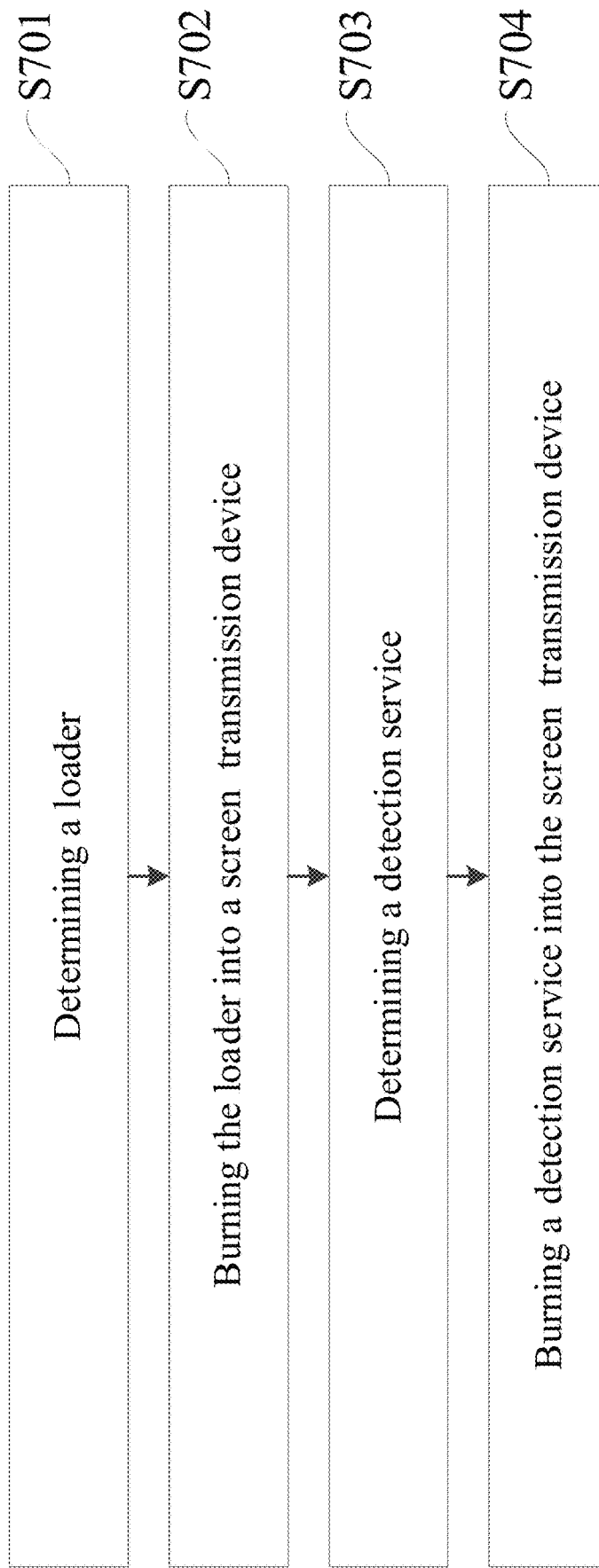
FIG. 7 is a flowchart of a screen transmission processing method according to Embodiment 6 of the present disclosure.

FIG. 7 is a flowchart of a screen transmission processing method according to Embodiment 6 of the present disclosure. On the basis of the above-mentioned Embodiment 5, this embodiment adds a processing operation of burning detection service. The method includes the following steps—

S701, determining a loader,

S702, burning the loader into a screen transmission device,

S703, determining a detection service, and

S704, burning the detection service into the screen transmission device.

When the screen transmission device is connected to the target device or other device (such as personal computer), the detection service can be burned to the memory in the screen transmission device.

Since there are many types of operating systems for the source device, such as windows, Mac, Android, iOS, etc., in the memory of the screen transmission device, in order to be compatible with different types of operating systems, it is possible to, for different types of operating systems, burn a detection service suitable for registering and running different types of the operating system.

In the embodiment of the present disclosure, the detection service is used to be registered into the source device, and when it is determined that the screen transmission device is connected to the source device, the loader is started.

In a specific implementation, the detection service can start the screen transmission client in the following manner—determining that a screen transmission device is connected to a source device, wherein the screen transmission device is configured to connect a target device, and starting a loader in the screen transmission device.

In an embodiment, determining that the screen transmission device is connected to the source device includes— determining that an external device is connected to the source device, and if it is determined that there is a specified configuration file in the external device, determining that the external device is a screen transmission device.

In an embodiment, starting a loader in the screen transmission device includes—reading a specified character string from the configuration file in the screen transmission device, and starting the loader which is named with the character string in the screen transmission device.

In the embodiment of the present disclosure, since the application of starting the screen transmission client is basically similar to the application of Embodiment 4, the description is relatively simple. For the relevant parts, reference is made to the part of the description of Embodiment 4, which will not be described by the embodiment of the present disclosure in detail herein.

In the embodiment of the present disclosure, the detection service is burned in the screen transmission device, which is configured to be registered into the source device, and when it is determined that the screen transmission device is connected to the source device, the loader is started. The detection service has simple functions, a small volume, and small storage space for the screen transmission device. The screen transmission device carries the detection service, and the detection service can be registered when the screen transmission device is connected to the source device, thereby facilitating starting the loader without manually downloading the detection service from other approaches by the user, and improving the simplicity of the screen transmission operation.

Embodiment 7

Figure 8:
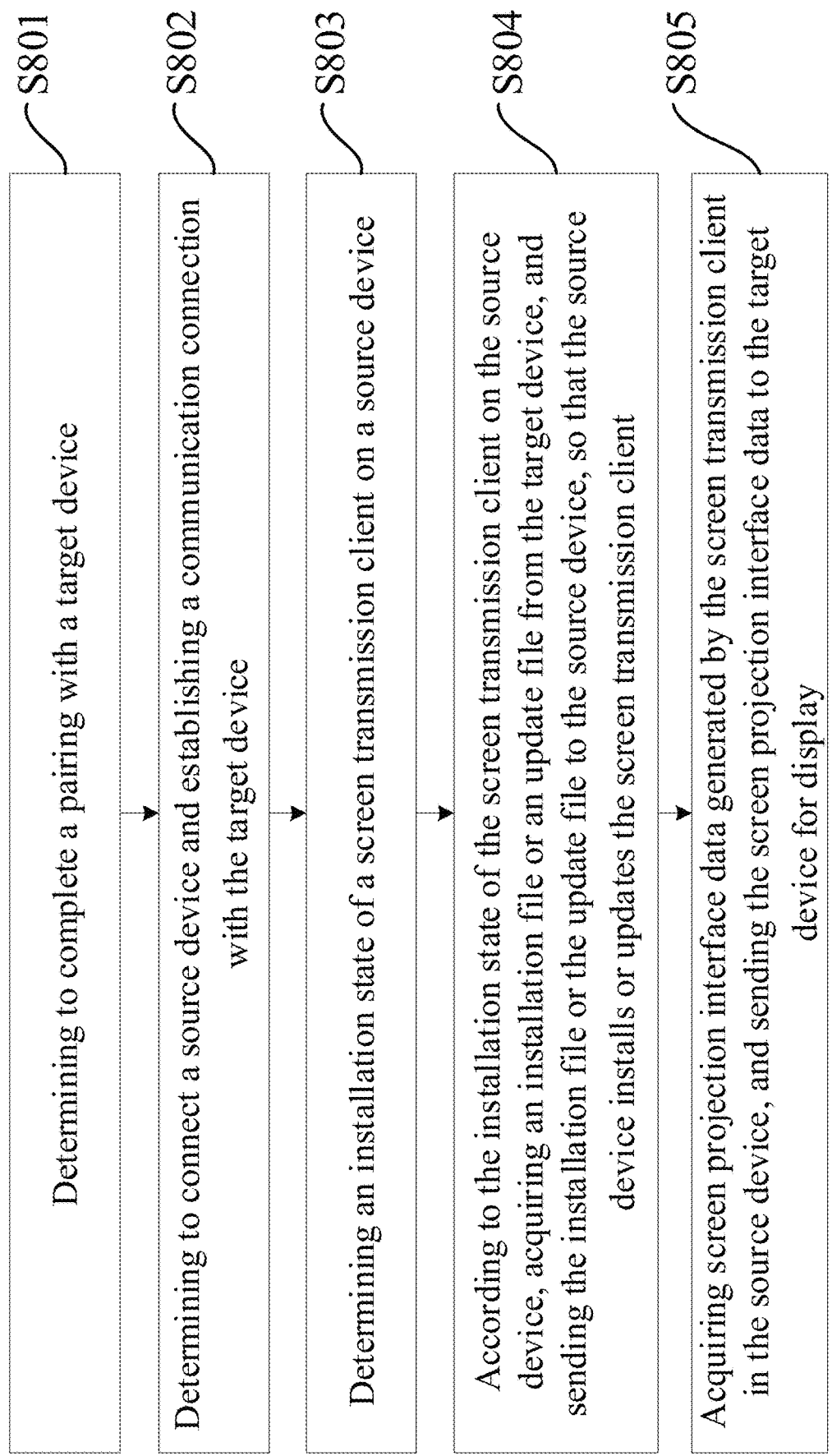
FIG. 8 is a flowchart of a screen transmission processing method according to Embodiment 7 of the present disclosure.

FIG. 8 is a flowchart of a screen transmission processing method according to Embodiment 7 of the present disclosure. This embodiment can be applied to the following situation—the screen transmission device has been paired with the target device, the screen transmission device is connected to the source device and is in a communication connection with the target device, and the screen transmission client is installed or updated in the source device. The method can be executed by a screen transmission processing device, which can be implemented by software and/or hardware, and can be configured in a screen transmission device, that is, the embodiment of the present disclosure is executed by the screen transmission device. The method includes the following steps—

S801, determining to complete a pairing with a target device.

The processing procedure of determining to complete a pairing with a target device in step S801 is the same as the processing procedure of pairing the screen transmission device with the target device in step S201 in Embodiment 1, which will not be repeated herein.

S802, determining to connect a source device and establishing a communication connection with the target device.

The processing procedure of determining to connect a source device and establishing a communication connection with the target device in step S802 is the same as the processing procedure of the screen transmission device connecting the target device in step S201 in Embodiment 1, which will not be repeated herein.

S803, determining an installation state of a screen transmission client on a source device.

For the processing procedure of determining an installation state of a screen transmission client on a source device in step S803, reference is made to the related content of the processing procedure of determining that the source device is not installed with the screen transmission client in step S202 in Embodiment 1, and the processing procedure of acquiring an installation file of the screen transmission client from the target device through the screen transmission device in step S203, and the processing procedure of determining that the screen transmission client is in a state to be updated in step S303 in Embodiment 2, which will not be repeated herein.

S804, according to the installation state of the screen transmission client on the source device, acquiring an installation file or an update file from the target device, and sending the installation file or the update file to the source device, so that the source device installs or updates the screen transmission client.

In a case, if the source device is not installed with the screen transmission client, the screen transmission device acquires the installation file of the screen transmission client from the target device screen transmission, and installs the installation file to the source device, so as to install the screen transmission client in the source device.

In another case, if the screen transmission client has been installed in the source device and the screen transmission client is in a state to be updated, the screen transmission device acquires the update file of the screen transmission client from the target device screen transmission, and according to the update file, updates the screen transmission client.

In still another case, if the screen transmission client has been installed in the source device and the screen transmission client is in a runnable state, the screen transmission client is started.

The processing procedure of step S804 includes the processing procedures of step S203 and step S204 in Embodiment 1, step S304 and step S305 in Embodiment 2, and step S404 in Embodiment 3, which will not be repeated herein.

S805, acquiring screen projection interface data generated by the screen transmission client in the source device, and sending the screen projection interface data to the target device for display.

In the embodiment of the present disclosure, the user can play document data such as PPT (PowerPoint), PDF (Portable Document Format), and word. on the source device, and can also play multimedia data such as video data and audio data. At the same time, the screen transmission client can perform a screenshot operation through GDI, mirror, ddraw, dxgi, etc., and acquire the screen data of the screenshot operation as the screen projection interface data, and send it to the screen transmission device through a transmission interface (such as USB interface).

The screen transmission device sends the screen projection interface data to the target device through a wireless connection (such as Wi-Fi connection), and the target device displays the screen projection interface data on the screen.

In the embodiments of the present disclosure, it is determined to complete a pairing with a target device, it is determined to connect a source device and a communication connection is established with the target device, an installation state of a screen transmission client on a source device is determined, an installation file or an update file is acquired from the target device according to the installation state of the screen transmission client on the source device, and the installation file or the update file is sent to the source device, so that the source device installs or updates the screen transmission client. On the one hand, by burning a program in the screen transmission device to acquire the installation or update file of the screen transmission client from the target device and installs or updates the screen transmission client on the source device, instead of burning the screen transmission client itself in the screen transmission device, the volume of the screen transmission client is not limited to the storage space of the screen transmission device. The storage space of the target device is generally much larger than the volume of the screen transmission client, and thereby new functions of the screen transmission client can be continuously developed to ensure the performance of the screen transmission client, so as to ensure the stability of the screen transmission. Moreover, when the screen transmission client is updated, it is sufficient to update the screen transmission client of the source device without frequently burning the screen transmission client in the screen transmission device, which greatly improves the simplicity of the update operation. On the other hand, the update of the screen transmission client does not affect the program, so that the function of the program is stable and the program does not need to be updated frequently, which ensures the maintainability for the simplicity of the screen transmission device. Moreover, by the manner of connecting the screen transmission device and downloading the screen transmission client from the target device that is paired with the screen transmission device for installation or updating, it is possible to ensure that the screen transmission client in the source device is consistent with the requirement of the target device, thereby ensuring the adaptation between the source device and the target device, and reducing problems due to version compatibility.

Secondly, the description file is configured for the screen transmission client and the description file is searched for in the source device. If the description file is found, it is determined that the screen transmission client has been installed in the source device, or the source device is not installed with the screen transmission client. In addition to recording the client parameters of the screen transmission client, the description file can also be reused as the identification of whether to install the screen transmission client, which is easy to operate and short in detection time.

Furthermore, the update files include a program file and a description file. By storing or replacing the program file and description file to install or update the screen transmission client, the installation and update of the screen transmission client can be realized without modifying registry, system settings, shortcuts, etc., which can reduce the probability of being intercepted by security applications as risky operations, and ensure the success rate of installing or updating the screen transmission client, so that the screen transmission client can operate normally, thereby ensuring the stability of the screen transmission.

Figure 9:
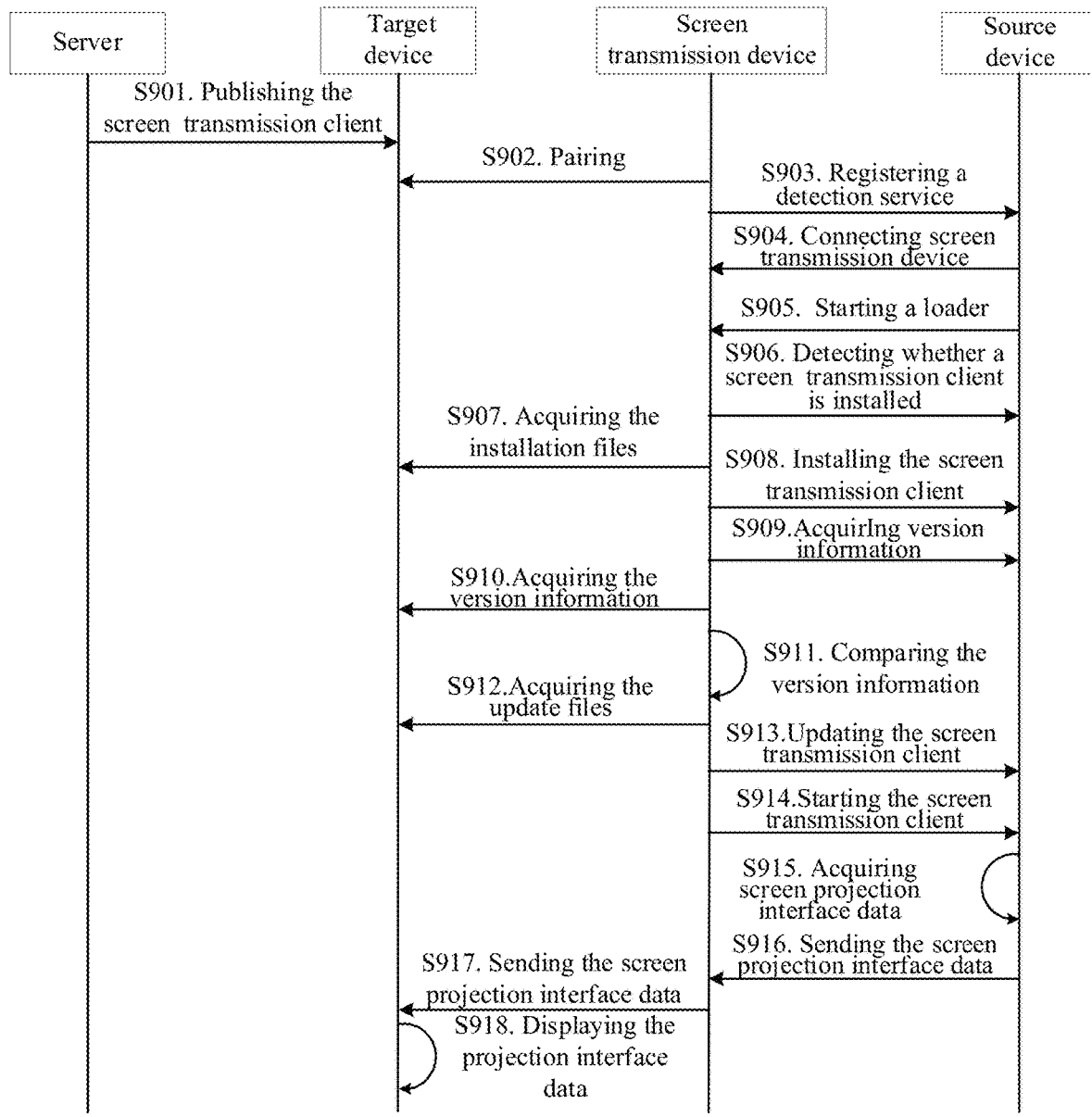
FIG. 9 is a flowchart of installation, update, and startup of a screen transmission client according to some embodiments of the present disclosure.

In order to enable those skilled in the art to better understand the embodiments of the present disclosure, as shown in FIG. 9, hereinafter, examples are used to illustrate the installation, update, and startup methods of the screen transmission client in the embodiments of the present disclosure.

In this example, the screen transmission device has pre-burned the detection service and the loader.

In S901, the server publishes the screen transmission client, pushes the program file and description file of the screen transmission client to the target device, and the target device stores the program file and description file of the screen transmission client.

In S902, the target device is remained as a wireless access point, the screen transmission device is inserted into the target device through a USB interface and paired with the target device, and the screen transmission device records an IP address, SSID and a password of the target device.

In S903, the screen transmission device is unplugged from the target device and is connected to the source device through the USB interface. On the one hand, the screen transmission device establishes a Wi-Fi connection with the target device after successfully verifying the SSID and password. On the other hand, the user starts the detection service, the detection service is registered into the source device, and as a startup item, starts when the source device starts, and keeps running in the background.

In S904, the detection service detects that the screen transmission device is connected to the source device, so that in S905, the detection service starts the loader in the screen transmission device.

In S906, the loader detects whether a screen transmission client is installed in the source device, if so, S909 is executed, if not, S907 is executed.

In S907, if the source device is not installed with a screen transmission client, the loader acquires the installation files of the screen transmission client which includes a program file and a description file from the target device.

In S908, the loader installs the installation file to the source device, that is, saves the program file and the description tion file to the specified installation directory, to complete the installation of the screen transmission client.

In S909, the loader reads the version information of the program file recorded in the description file from the source device.

In S910, the loader acquires the version information of the program file recorded in the description file from the target device.

In S911, the loader compares the version information of the program file at the source device with the version information of the program file at the target device.

If the two sets of version information are the same, S914 is executed, and if the two sets of version information are different, S912 is executed.

In S912, the loader acquires the update files of the screen transmission client from the target device, wherein the screen transmission client includes program files and description files with different version information.

In S913, the loader uses the update file to update the screen transmission client, that is, the program file and description file in the source device are replaced with the program file and description file in the target device.

In S914, the loader reads the startup parameters of the program file recorded in the description file from the source device, inputs the startup parameters into the program file, and starts the program file, thereby starting the screen transmission client.

In S915, the screen transmission client in the source device performs a screenshot operation to acquire screen projection interface data.

In S916, the screen transmission client in the source device sends the screen projection interface data to the screen transmission device through the USB interface.

In S917, the screen transmission device sends the screen projection interface data to the target device (IP address) through the Wi-Fi connection.

In S918, the target device displays the projection interface data.

Embodiment 8

Figure 10:
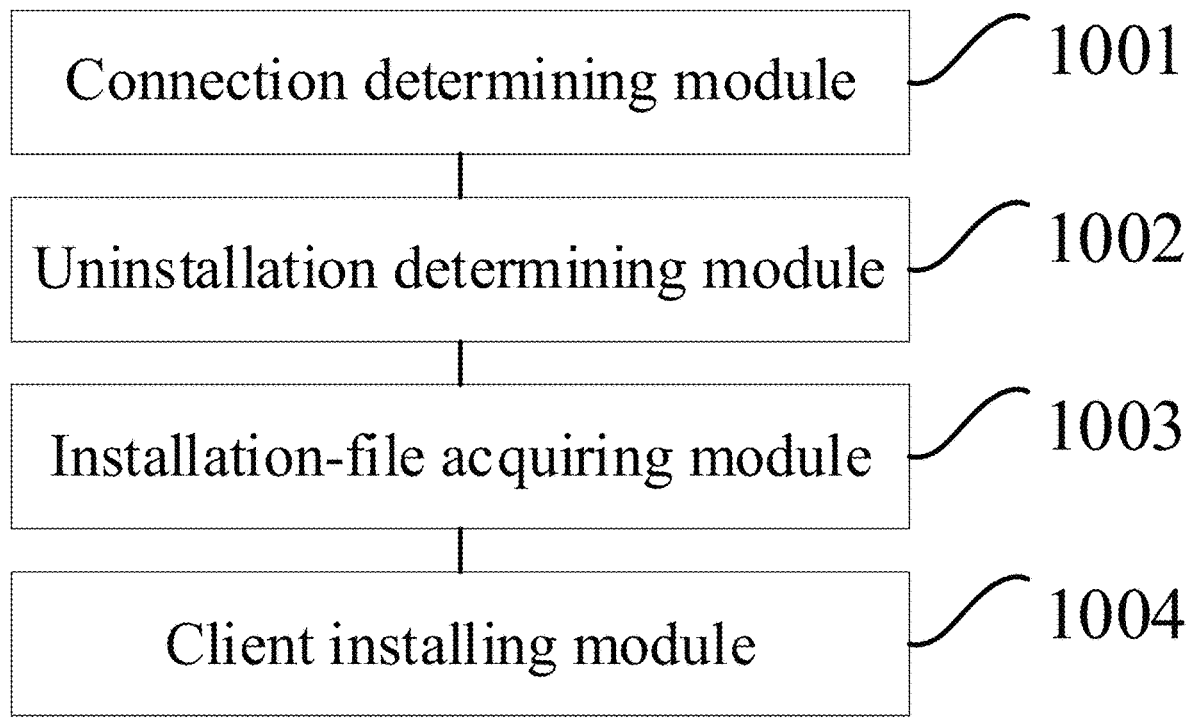
FIG. 10 is a schematic structure diagram of a screen transmission processing apparatus according to Embodiment 8 of the present disclosure.

FIG. 10 is a schematic structure diagram of a screen transmission processing apparatus according to Embodiment 8 of the present disclosure. The device may include the following modules—a connection determining module 1001, configured to determine that a source device is connected to a screen transmission device, wherein the screen transmission device is configured to be in a communication connection with a target device with which a pairing is completed, an uninstallation determining module 1002, configured to determine that the source device has not been installed with a screen transmission client, wherein the screen transmission client is configured to perform a screen transmission operation between the source device and the target device through the screen transmission device, so that the target device displays screen projection interface data of the source device, an installation-file acquiring module 1003, configured to acquire an installation file of the screen transmission client from the target device through the screen transmission device, and a client installing module 1004, configured to install the installation file to the source device so as to install the screen transmission client in the source device.

In an embodiment of the present disclosure, the uninstallation determining module 1002 includes—a file-information searching sub-module, configured to acquire file information of the screen transmission client written by the screen transmission device to which the source device is connected, a description-file searching sub-module, configured to, according to the file information, search for a description file in the source device, wherein the description file is used to record a client parameter of the screen transmission client, and a not-find determining sub-module, configured to, if the description file is not found, determine that the source device has not been installed with the screen transmission client.

In an embodiment of the present disclosure, the screen transmission device acquires and stores communication parameters of the target device by connecting the target device, so as to complete a pairing with the target device.

In an embodiment of the present disclosure, the installation file includes a program file and a description file.

The client installing module 1004 includes—a program-file storing sub-module, configured to store the program file to a specified installation directory in the source device, and a description-file storing sub-module, configured to store the description file to a specified installation directory in the source device.

The screen transmission processing device provided by the embodiment of the present disclosure can execute the screen transmission processing method provided in any embodiment of the present disclosure, and has the corresponding functional modules and beneficial effects for executing the method.

Embodiment 9

Figure 11:
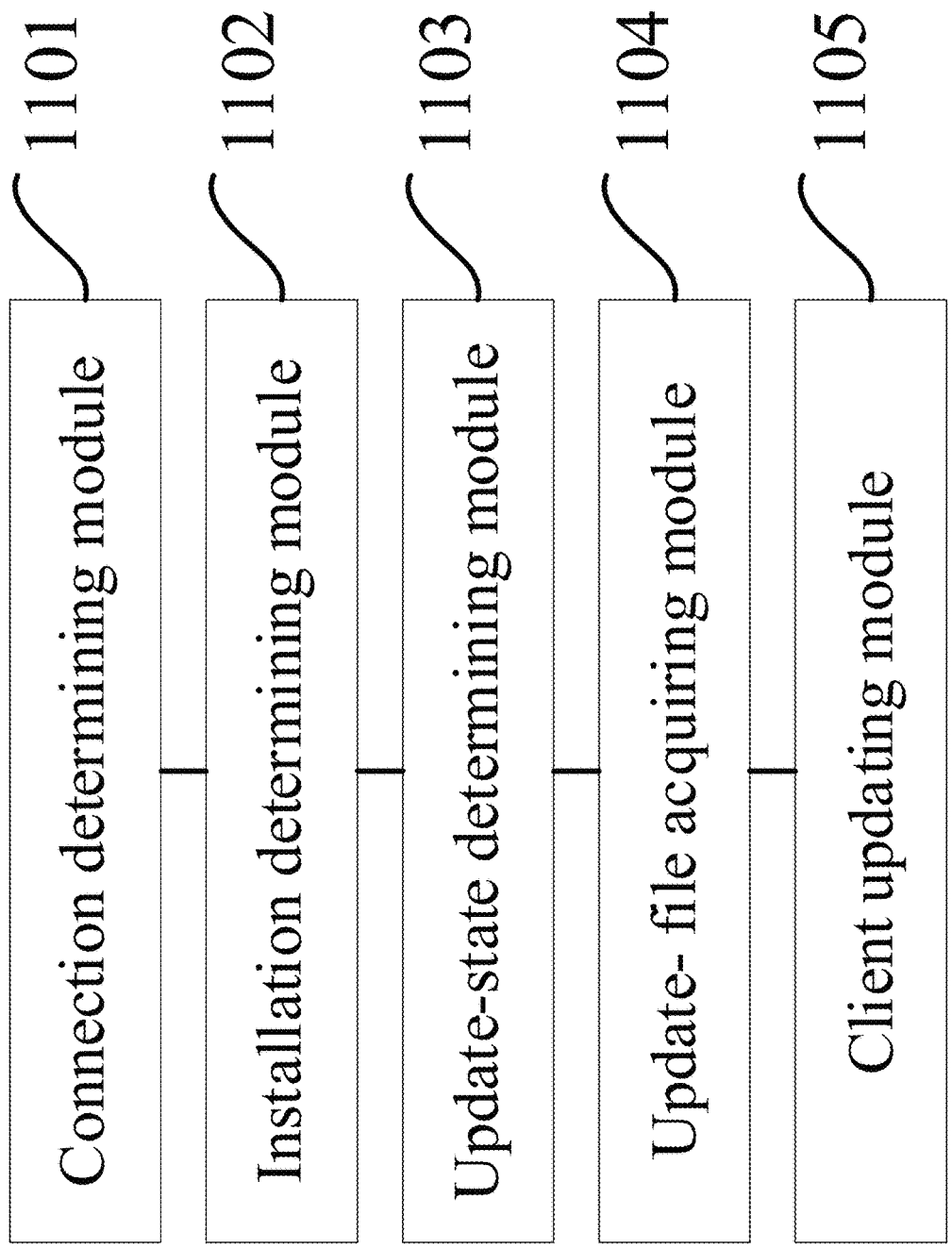
FIG. 11 is a schematic structure diagram of a screen transmission processing apparatus according to Embodiment 9 of the present disclosure.

FIG. 11 is a schematic structure diagram of a screen transmission apparatus according to Embodiment 9 of the present disclosure. The device may include the following modules—a connection determining module 1101, configured to determine that a source device is connected to a screen transmission device, wherein the screen transmission device is configured to be in a communication connection with a target device with which a pairing is completed, an installation determining module 1102, configured to determine that a screen transmission client has been installed in the source device, wherein the screen transmission client is configured to perform a screen transmission operation between the source device and the target device through the screen transmission device, so that the target device displays screen projection interface data of the source device, an update-state determining module 1103, configured to determine that the screen transmission client is in a state to be updated, an update-file acquiring module 1104, configured to, in response to the state to be updated, acquire an update file of the screen transmission client from the target device through the screen transmission device, and a client updating module 1105, configured to, according to the update file, update the screen transmission client.

In an embodiment of the present disclosure, the installation determining module 1102 includes—a file-information searching sub-module, configured to acquire file information of the screen transmission client written by the screen transmission device to which the source device is connected, a description-file searching sub-module, configured to, according to the file information, search for a description file in the source device, wherein the description file is used to record a client parameter of the screen transmission client, and a find determining sub-module, configured to, if the description file is found, determine that the screen transmission client has been installed in the source device.

In an embodiment of the present disclosure, the screen transmission device acquires and stores communication parameters of the target device by connecting the target device, so as to complete a pairing with the target device.

In an embodiment of the present disclosure, the screen transmission client has a program file and a description file, and the description file is used to record a client parameter of the screen transmission client, and the client parameter include version information of the program file.

The update-state determining module 1103 includes—a first-version reading sub-module, configured to read the version information of the program file from the description file as a first version, a second-version acquiring sub-module, configured to acquire the version information of the program file from the target device through the screen transmission device as a second version, and a to-be-updated determining sub-module, configured to, if the first version is different from the second version, determine that the screen transmission client is in the state to be updated.

In an embodiment of the present disclosure, the update file includes a program file and a description file, the client updating module 1105 includes—an installation-directory determining sub-module, configured to determine an installation directory, wherein the installation directory is used to store the program file and the description file of the screen transmission client, a program-file replacing sub-module, configured to replace a program file in the installation directory with the program file in the update file, and a description-file replacing sub-module, configured to replace a description file in the installation directory with the description file in the update file.

In an embodiment of the present disclosure, the apparatus further includes—a runnable-state determining module, configured to determine that the screen transmission client is in a runnable state, and a client starting module, configured to, in response to the runnable state, start the screen transmission client.

In an embodiment of the present disclosure, the screen transmission client has a program file and a description file, and the description file is used to record a client parameter of the screen transmission client, and the client parameter include version information of the program file.

The runnable-state determining module includes—a first-version reading sub-module, configured to read the version information of the program file from the description file as a first version, a second-version acquiring sub-module, configured to acquire the version information of the program file from the target device through the screen transmission device as a second version, and a runnable-state determining sub-module, configured to, if the first version is the same as the second version, determine that the screen transmission client is in a runnable state.

In an embodiment of the present disclosure, the screen transmission client has a program file and a description file, and the description file is used to record a client parameter of the screen transmission client, and the client parameter include a startup parameter of the program file.

The client starting module includes—a startup-parameter reading sub-module, configured to, in response to the runnable state, read the startup parameter of the program file from the description file, and a startup-parameter starting sub-module, configured to, in accordance with the startup parameter, start the program file.

The screen transmission processing apparatus provided by the embodiment of the present disclosure can execute the screen transmission processing method provided in any embodiment of the present disclosure, and has the corresponding functional modules and beneficial effects for executing the method.

Embodiment 10

Figure 12:
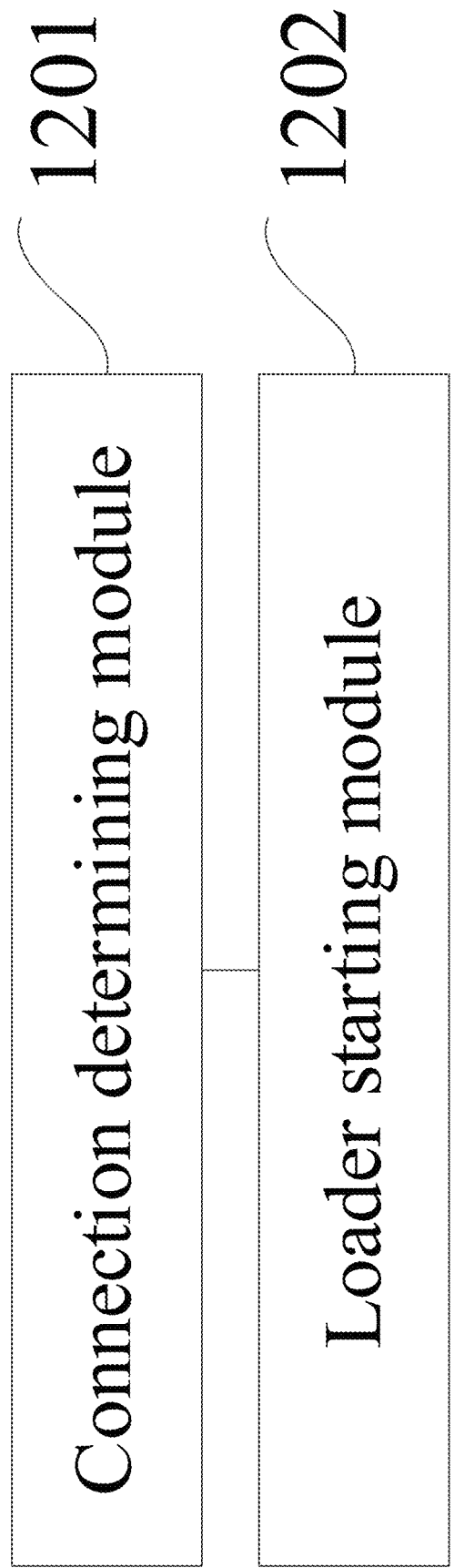
FIG. 12 is a schematic structure diagram of a screen transmission processing apparatus according to Embodiment 10 of the present disclosure.

FIG. 12 is a schematic structure diagram of a screen transmission processing apparatus according to Embodiment 10 of the present disclosure. The apparatus may include the following modules—a connection determining module 1201, configured to determine that a screen transmission device is connected to a source device, wherein the screen transmission device is configured to be in a communication connection with a target device with which a pairing is completed, and a loader starting module 1202, configured to start a loader in the screen transmission device, wherein the loader is configured to determine an installation state of the screen transmission client on the source device, and according to the installation state of the screen transmission client on the source device, acquire an installation file or an update file from the target device, and send the installation file or the update file to the source device, so that the source device installs or updates the screen transmission client, and the screen transmission client is configured to perform a screen transmission operation between the source device and the target device through the screen transmission device, so that the target device displays screen projection interface data of the source device.

In an embodiment of the present disclosure, the connection determining module 1201 includes—an external-device-connection determining sub-module, configured to determine that an external device is connected to the source device, and a configuration-file determining sub-module, configured to, if it is determined that there is a specified configuration file in the external device, determine that the external device is a screen transmission device.

In an embodiment of the present disclosure, the loader starting module 1202 includes—a character-string reading sub-module, configured to read a specified character string from the configuration file in the screen transmission device, and a character-string starting sub-module, configured to start the loader which is named with the character string in the screen transmission device.

The screen transmission processing apparatus provided by the embodiment of the present disclosure can execute the screen transmission processing method provided in any embodiment of the present disclosure, and has the corresponding functional modules and beneficial effects for executing the method.

Embodiment 11

Figure 13:
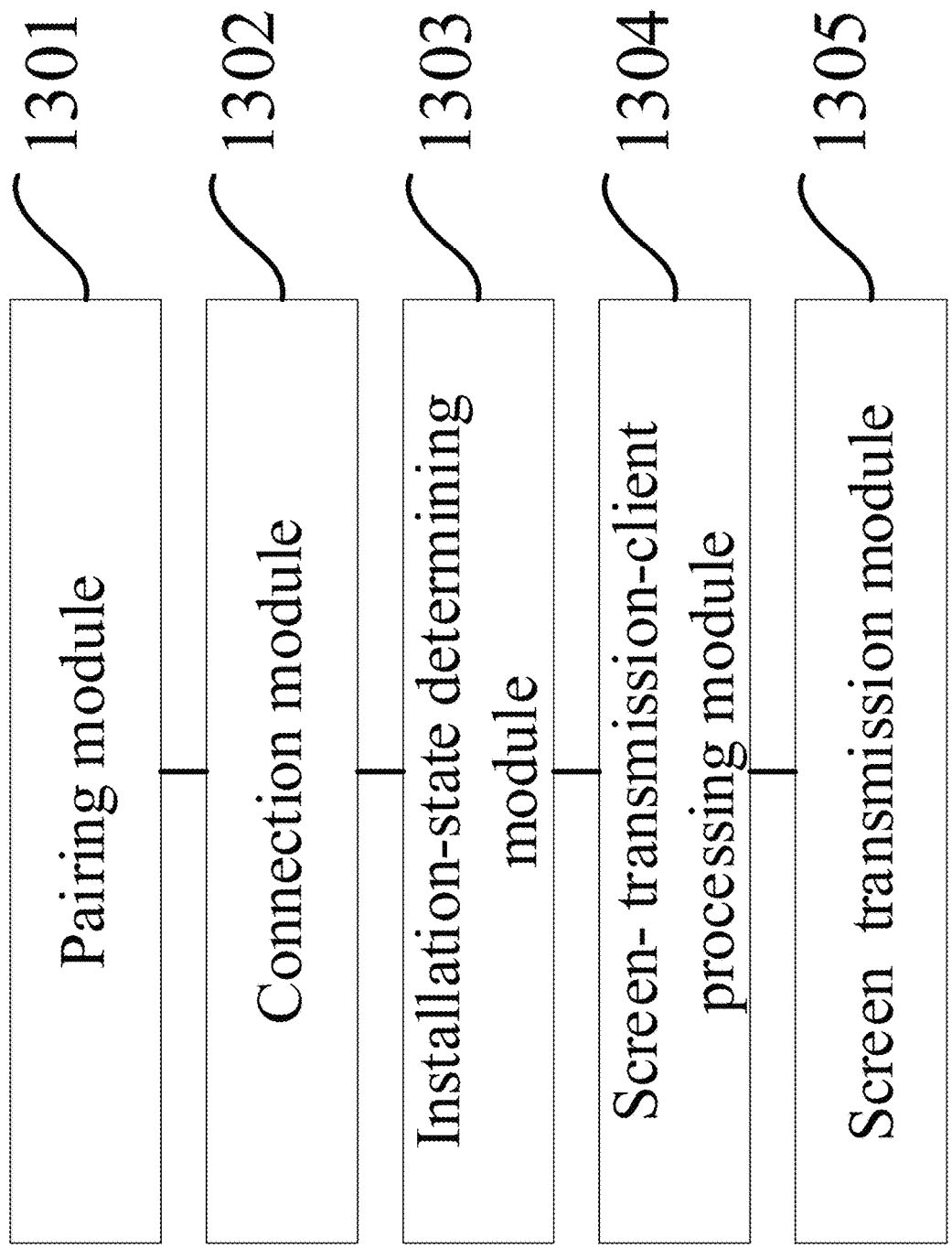
FIG. 13 is a schematic structure diagram of a screen transmission processing apparatus according to Embodiment 11 of the present disclosure.

FIG. 13 is a schematic structure diagram of a screen transmission apparatus according to Embodiment 11 of the present disclosure. The apparatus, located in a screen transmission device, may include the following modules—a pairing module 1301, configured to determine to complete a pairing with a target device, a connection module 1302, configured to determine to connect a source device and establish a communication connection with the target device, an installation-state determining module 1303, configured to determine an installation state of a screen transmission client on a source device, wherein the screen transmission client is configured to perform a screen transmission operation between the source device and the target device through the screen transmission device, a screen-transmission-client processing module 1304, configured to, according to the installation state of the screen transmission client on the source device, acquire an installation file or an update file from the target device, and send the installation file or the update file to the source device, so that the source device installs or updates the screen transmission client, and a screen transmission module 1305, configured to acquire screen projection interface data generated by the screen transmission client in the source device, and send the screen projection interface data to the target device for display.

In an embodiment of the present disclosure, the pairing module 1301 includes—a communication-parameter storing sub-module, configured to connect a target device, and acquire and store communication parameters of the target device.

In an embodiment of the present disclosure, the screen transmission module 1305 includes—an operation responding sub-module, configured to receive the user's operation on the screen transmission device, and acquire the screen projection interface data generated by the screen transmission client of the source device.

In an embodiment of the present disclosure, the installation-state determining module 1303 includes—a file-information searching sub-module, configured to acquire file information of the screen transmission client written by the screen transmission device to which the source device is connected, a description-file searching sub-module, configured to, according to the file information, search for a description file in the source device, wherein the description file is used to record a client parameter of the screen transmission client, and a not-find determining sub-module, configured to, if the description file is not found, determine that the source device has not been installed with the screen transmission client, a find determining sub-module, configured to, if the description file is found, determine that the screen transmission client has been installed in the source device, a state determining module, configured to determine that the screen transmission client is in a state to be updated, or to determine that the screen transmission client is in an runnable state, a runnable-state determining sub-module, configured to, if the first version is the same as the second version, determine that the screen transmission client is in the runnable state.

In an embodiment of the present disclosure, the screen transmission client has a program file and a description file. The description file is used to record the client parameters of the screen transmission client, and the client parameters include version information of the program file.

The state determining sub-module includes—a first-version reading sub-module, configured to read the version information of the program file from the description file as a first version, a second-version acquiring sub-module, configured to acquire the version information of the program file from the target device through the screen transmission device as a second version, a to-be-updated determining sub-module, configured to, if the first version is different from the second version, determine that the screen transmission client is in the state to be updated, and a runnable-state determining sub-module, configured to, if the first version is the same as the second version, determine that the screen transmission client is in the runnable state.

In an embodiment of the present disclosure, the screen-transmission-client processing module 1304 includes—an installation-file acquiring module, configured to if the source device is not installed with the screen transmission client, acquire an installation file of the screen transmission client from the target device through the screen transmission device, and a client installing module, configured to send the installation file to the source device so as to install the screen transmission client in the source device, or, an update-file acquiring module, configured to acquire an update file of the screen transmission client from the target device through the screen transmission device, and a client updating module, configured to, according to the update file, update the screen transmission client, or, a client starting module, configured to, if the screen transmission client has been installed in the source device and the screen transmission client is in a runnable state, start the screen transmission client.

In an embodiment of the present disclosure, the installation file includes a program file and a description file, and the client installing module includes—a program-file storing sub-module, configured to store the program file to a specified installation directory in the source device, and a description-file storing sub-module, configured to store the description file to a specified installation directory in the source device.

In an embodiment of the present disclosure, the update file includes a program file and a description file. The client update module includes—an installation-directory determining sub-module, configured to determine an installation directory, wherein the installation directory is used to store the program file and the description file of the screen transmission client, a program-file replacing sub-module, configured to replace a program file in the installation directory with the program file in the update file, and a description-file replacing sub-module, configured to replace a description file in the installation directory with the description file in the update file.

In an embodiment of the present disclosure, the screen transmission client has a program file and a description file, and the description file is used to record a client parameter of the screen transmission client, and the client parameter include a startup parameter of the program file.

The client starting module includes—a startup-parameter reading sub-module, configured to, in response to the runnable state, read the startup parameter of the program file from the description file, and a startup-parameter starting sub-module, configured to, in accordance with the startup parameter, start the program file.

The screen transmission processing apparatus provided by the embodiment of the present disclosure can execute the screen transmission processing method provided in any embodiment of the present disclosure, and has the corresponding functional modules and beneficial effects for executing the method.

Embodiment 12

Figure 14:
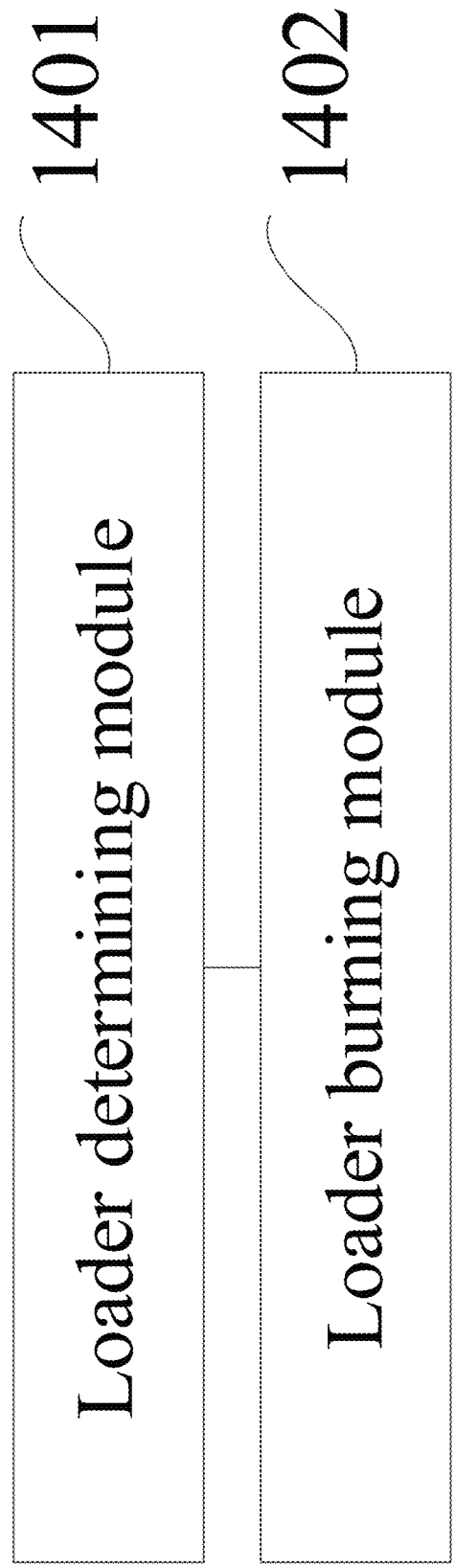
FIG. 14 is a schematic structure diagram of a screen transmission apparatus according to Embodiment 12 of the present disclosure.

FIG. 14 is a schematic structure diagram of a screen transmission apparatus according to Embodiment 12 of the present disclosure. The apparatus may include the following modules—a loader determining module 1401, configured to determine a loader, and a loader burning module 1402, configured to burn the loader into a screen transmission device, wherein the screen transmission device is configured to connect a source device and be in a communication connection with a target device with which a pairing is completed, wherein the loader is configured to determine an installation state of the screen transmission client on the source device, and according to the installation state of the screen transmission client on the source device, acquire an installation file or an update file from the target device, and send the installation file or the update file to the source device, so that the source device installs or updates the screen transmission client. And the screen transmission client is configured to perform a screen transmission operation between the source device and the target device through the screen transmission device, so that the target device displays screen projection interface data of the source device.

In an embodiment of the present disclosure, the apparatus further includes—a detection-service determining module, configured to determine a detection service, and a detection-service burning module, configured to burn a detection service into the screen transmission device, wherein the detection service is used to be registered into the source device, and when it is determined that the screen transmission device is connected to the source device, the loader is started.

The screen transmission processing device provided by the embodiment of the present disclosure can execute the screen transmission processing method provided in any embodiment of the present disclosure, and has the corresponding functional modules and beneficial effects for executing the method.

Embodiment 13

Figure 15:
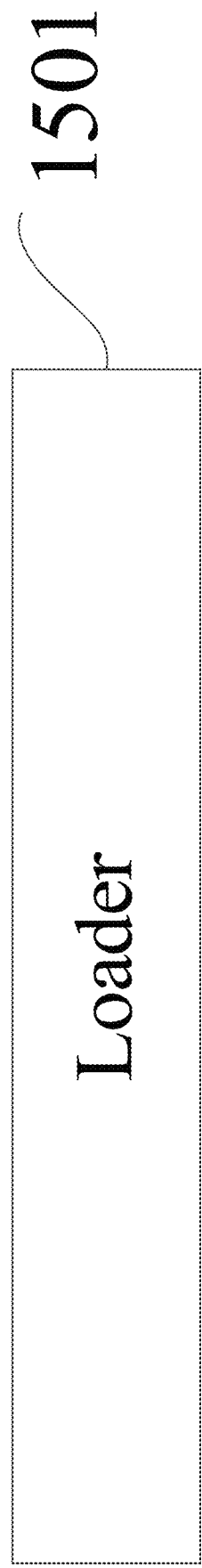
FIG. 15 is a schematic structure diagram of a screen transmission device according to Embodiment 13 of the present disclosure.

FIG. 15 is a schematic structure diagram of a screen transmission device according to Embodiment 13 of the present disclosure. The screen transmission device is configured to connect a source device and connect a target device, respectively. The screen transmission device includes—a loader 1501, configured to determine an installation state of the screen transmission client on the source device, acquire an installation file or an update file from the target device according to the installation state of the screen transmission client on the source device, and send the installation file or the update file to the source device, so that the source device installs or updates the screen transmission client, wherein the screen transmission client is configured to perform a screen transmission operation between the source device and the target device through the screen transmission device, so that the target device displays screen projection interface data of the source device.

In an embodiment of the present disclosure, the device further includes—a detection service, configured to be registered into the source device, and when it is determined that the screen transmission device is connected to the source device, start the loader in the source device.

The screen transmission device provided by the embodiment of the present disclosure can execute the screen transmission processing method provided in any embodiment of the present disclosure, and has the corresponding functional modules and beneficial effects for executing the method.

Embodiment 14

Figure 16:
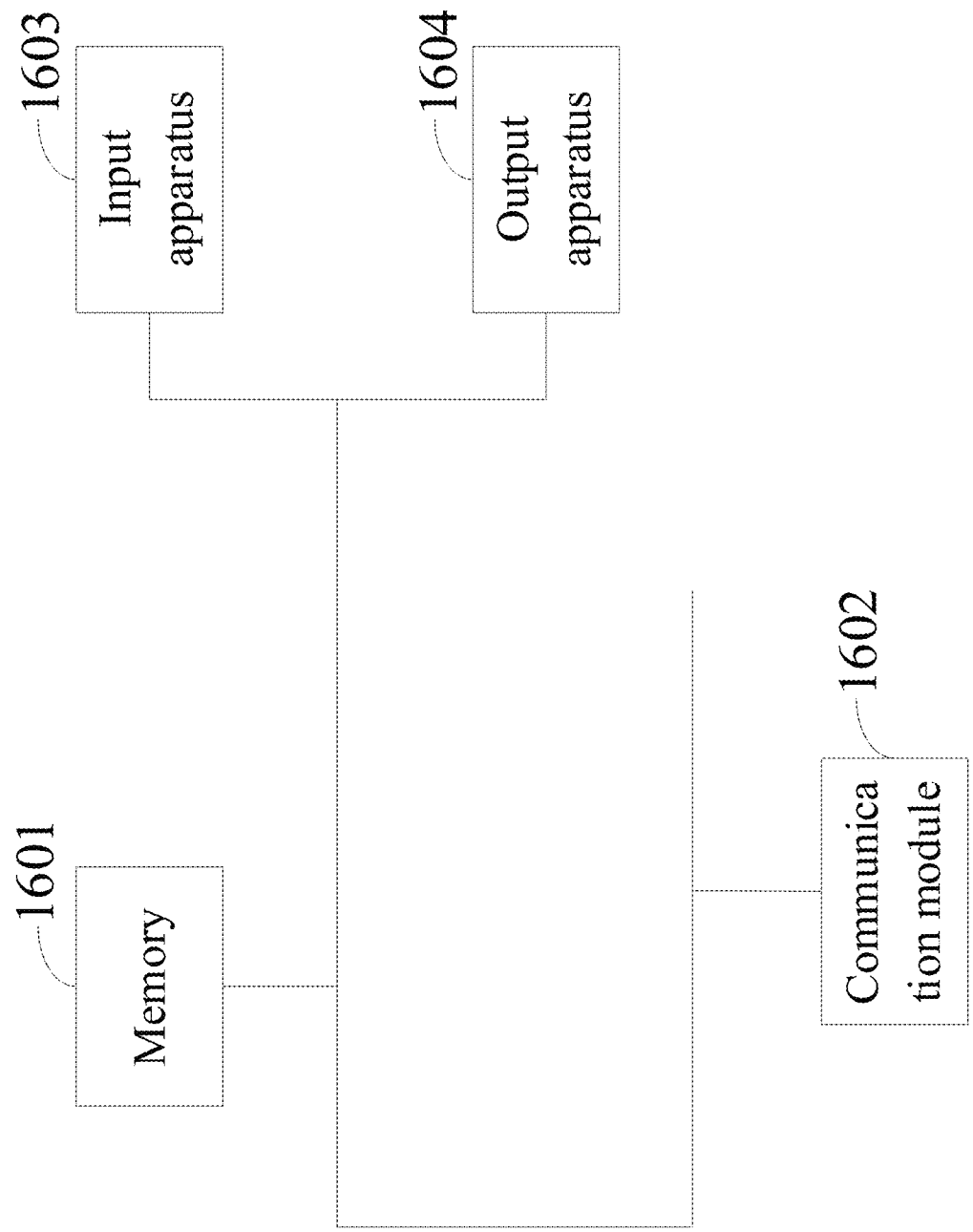
FIG. 16 is a schematic structure diagram of an electronic device according to Embodiment 14 of the present disclosure.

FIG. 16 is a schematic structure diagram of an electronic device according to Embodiment 14 of the present disclosure. As shown in FIG. 16, the electronic device includes a memory 1601, a communication module 1602, an input apparatus 1603, and an output apparatus 1604. The memory 1601, the communication module 1602, the input apparatus 1603 and the output apparatus 1604 in the electronic device can be connected by a bus or other means. FIG. 16 takes a bus connection as an example.

The memory 1601, as a computer-readable storage medium, can be configured to store software programs, computer-executable programs, and modules, such as the modules corresponding to the screen transmission processing method in this embodiment (for example, the connection determining module 1001, the uninstallation determining module 1002, the installation-file acquiring module 1003, and the client installing module 1004 in the screen transmission processing apparatus shown in FIG. 10, or, the connection determining module 1101, the installation determining module 1102, the update-state determining module 1103, the update-file acquiring module 1104, the client updating module 1105 in the screen transmission processing apparatus shown in FIG. 11). These software programs, computer executable programs, and modules can be loaded into other electronic devices. The electronic device has a processor. The number of processors can be one or more. The processor runs the software programs, instructions, and modules, so as to execute the various functional applications and data processing of the electronic device, that is, realize the above-mentioned screen transmission processing method.

The memory 1601 may mainly include a program storage area and a data storage area. Thereinto, the program storage area may store an operating system and an application program required by at least one function. The data storage area may store data created according to the use of an electronic device, and the like. In addition, the memory 1601 may include a high-speed random access memory, and may also include a non-volatile memory, such as at least one magnetic disk storage device, a flash memory device, or other non-volatile solid state storage devices. In some examples, the memory 1601 may further include memories remotely provided with respect to the processor 1600, and these remote memories may be connected to an electronic device through a network. Examples of the above-mentioned networks include, but are not limited to, the Internet, corporate intranet, local area network, mobile communication network, and combinations thereof.

The communication module 1602 is configured to establish a connection with a display screen, and realize data interaction with the display screen. The input apparatus 1603 can be configured to receive inputted number or character information, and generate key signal input related to user settings and function controls of the electronic device.

The electronic device provided by the embodiment of the present disclosure can execute the screen transmission processing method provided in any embodiment of the present disclosure, and has the corresponding functional modules and beneficial effects for executing the method.

Embodiment 15

Figure 17:
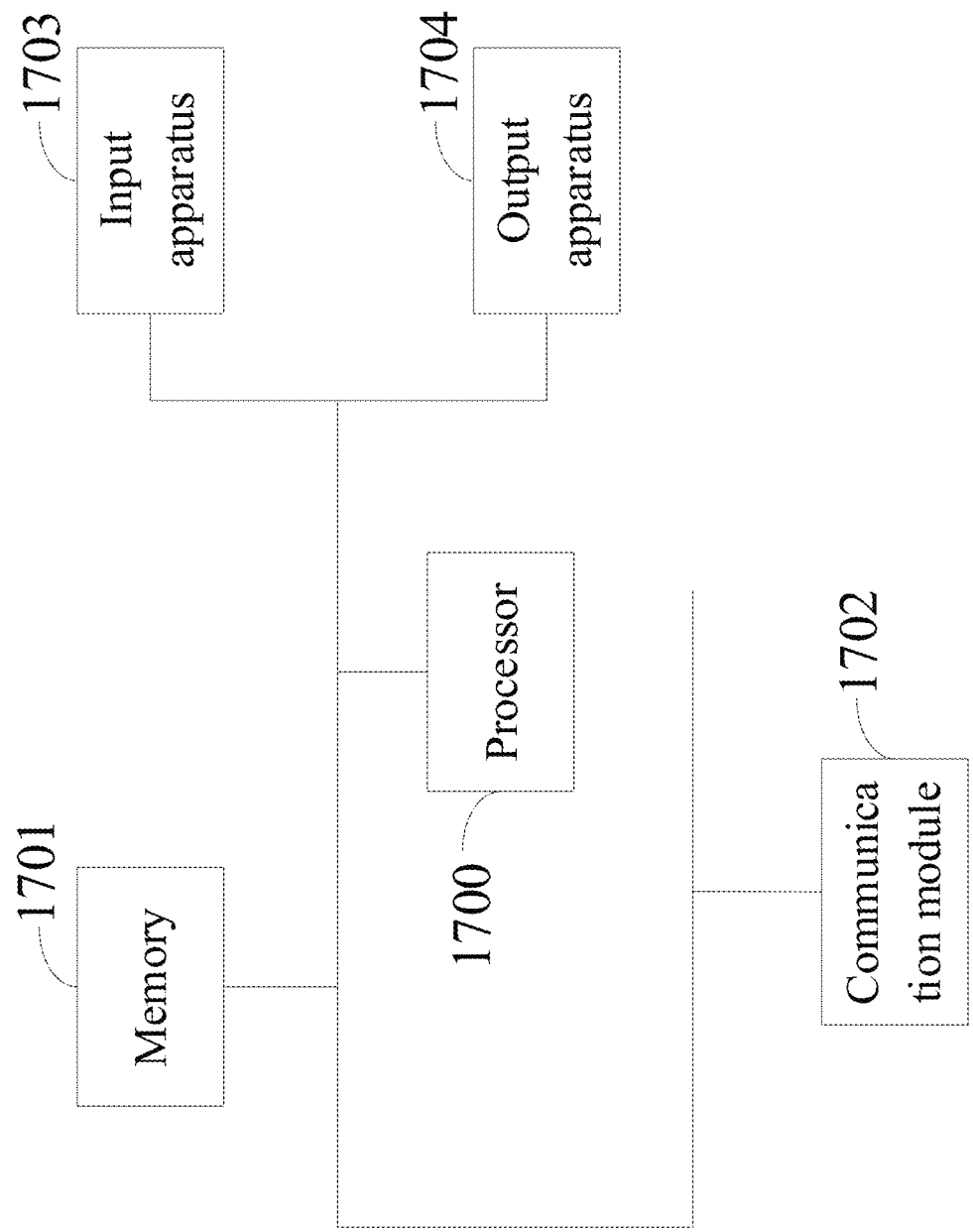
FIG. 17 is a schematic structure diagram of an electronic device according to Embodiment 15 of the present disclosure.

FIG. 17 is a schematic structure diagram of an electronic device according to Embodiment 15 of the present disclosure. As shown in FIG. 17, the electronic device includes a processor 1700, a memory 1701, a communication module 1702, an input apparatus 1703, and an output apparatus 1704. The number of processors 1700 in the electronic device can be one or more. FIG. 17 takes one processor 1700 as an example. The processor 1700, the memory 1701, the communication module 1702, the input apparatus 1703, and the output apparatus 1704 in the electronic device may be connected by a bus or other means. FIG. 17 takes a bus connection as an example.

The memory 1701, as a computer-readable storage medium, can be configured to store software programs, computer-executable programs, and modules, such as the modules corresponding to the screen transmission processing method in this embodiment (for example, the connection determining module 1201, the loader starting module 1202 shown in FIG. 12, or, the loader determining module 1401, the loader burning module 1402 shown in FIG. 14). The processor 1700 runs the software programs, instructions, and modules in the memory 1701, so as to execute the various functional applications and data processing of the electronic device, that is, realize the above-mentioned screen transmission processing method.

The memory 1701 may mainly include a program storage area and a data storage area. Thereinto, the program storage area may store an operating system and an application program required by at least one function. The data storage area may store data created according to the use of an electronic device, and the like. In addition, the memory 1701 may include a high-speed random access memory, and may also include a non-volatile memory, such as at least one magnetic disk storage device, a flash memory device, or other non-volatile solid state storage devices. In some examples, the memory 1701 may further include memories remotely provided with respect to the processor 1700, and these remote memories may be connected to an electronic device through a network. Examples of the above-mentioned networks include, but are not limited to, the Internet, corporate intranet, local area network, mobile communication network, and combinations thereof.

The communication module 1702 is configured to establish a connection with a display screen, and realize data interaction with the display screen. The input apparatus 1703 can be configured to receive inputted number or character information, and generate key signal input related to user settings and function control of the electronic device.

The electronic device provided by the embodiment of the present disclosure can execute the screen transmission processing method provided in any embodiment of the present disclosure, and has the corresponding functional modules and beneficial effects for executing the method.

Embodiment 16

Figure 18:
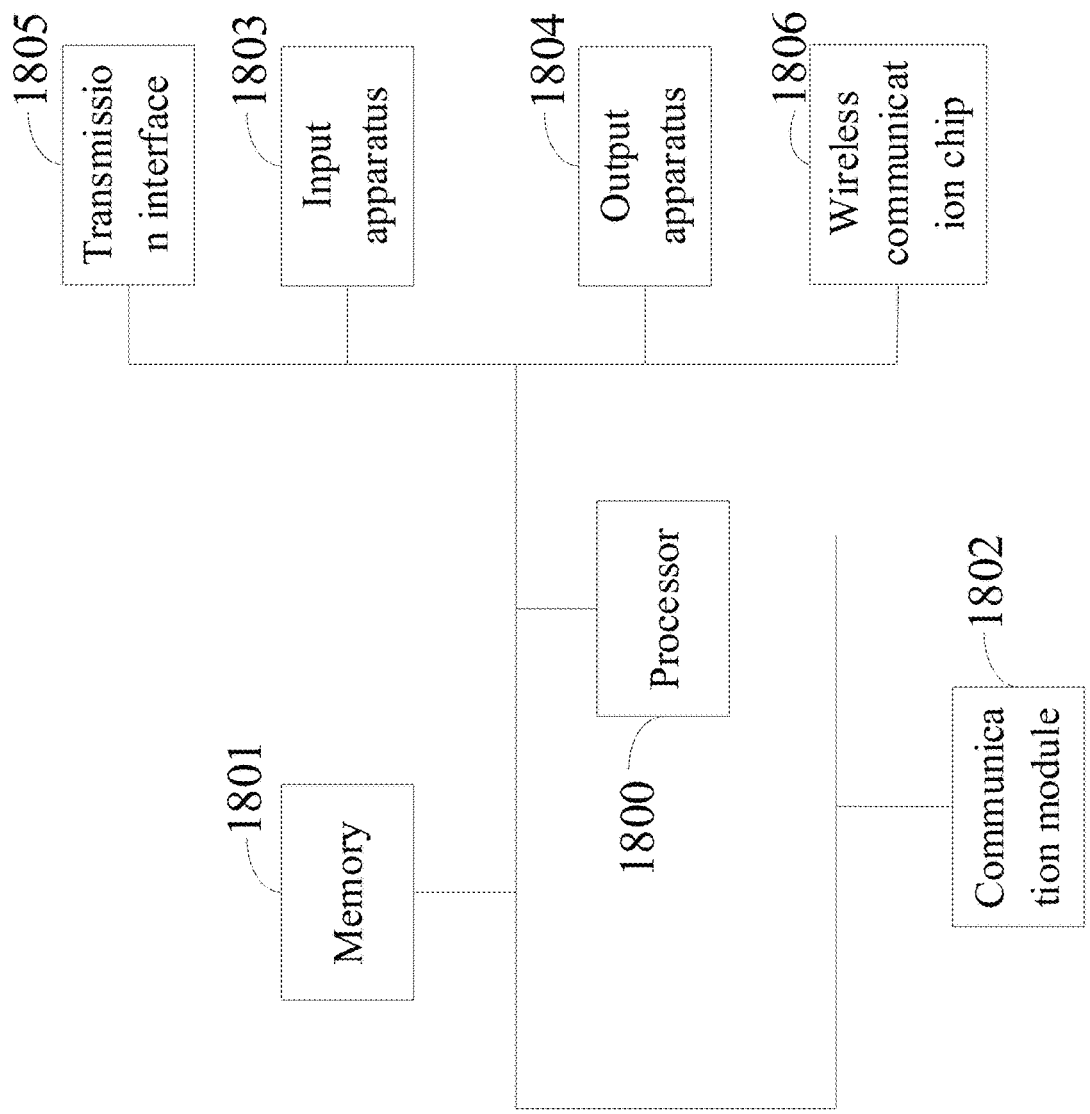
FIG. 18 is a schematic structure diagram of an electronic device according to Embodiment 16 of the present disclosure.

FIG. 18 is a schematic structure diagram of an electronic device according to Embodiment 16 of the present disclosure. As shown in FIG. 18, the electronic device includes a processor 1800, a memory 1801, a communication module 1802, an input apparatus 1803, an output apparatus 1804, a transmission interface 1805, and a wireless communication chip 1806. The number of processors 1800 in the electronic device can be one or more. FIG. 18 takes one processor 1800 as an example. The processor 1800, the memory 1801, the communication module 1802, the input apparatus 1803, and the output apparatus 1704 in the electronic device may be connected by a bus or other means. FIG. 18 takes a bus connection as an example.

The memory 1801, as a computer-readable storage medium, can be configured to store software programs, computer-executable programs, and modules, such as the modules corresponding to the screen transmission processing method in this embodiment (for example, the pairing module 1301, the connection module 1302, the installation-state determining module 1303, the screen-transmission-client processing module 1304, and the screen transmission module 1305 shown in FIG. 13). The processor 1800 runs the software programs, instructions, and modules stored in the memory 1801, so as to execute the various functional applications and data processing of the electronic device, that is, realize the above-mentioned screen transmission processing method.

The memory 1801 may mainly include a program storage area and a data storage area. Thereinto, the program storage area may store an operating system and an application program required by at least one function. The data storage area may store data created according to the use of an electronic device, and the like. In addition, the memory 1801 may include a high-speed random access memory, and may also include a non-volatile memory, such as at least one magnetic disk storage device, a flash memory device, or other non-volatile solid-state storage devices. In some examples, the memory 1801 may further include memories remotely provided with respect to the processor 1800, and these remote memories may be connected to an electronic device through a network. Examples of the above-mentioned networks include, but are not limited to, the Internet, corporate intranet, local area network, mobile communication network, and combinations thereof.

The communication module 1802 is configured to establish a connection with a display screen, and realize data interaction with the display screen. The input apparatus 1803 can be configured to receive inputted number or character information, and generate key signal input related to user settings and function control of the electronic device.

The transmission interface 1805 is an interface that makes an electronic device as an external device and connects to other devices, and is configured to connect a target device or a source device.

The wireless communication chip 1806 includes, but is not limited to, a Wi-Fi chip, a Bluetooth chip, etc., wherein the Wi-Fi chip can be applied to the 2.4G frequency band, 5G frequency band, etc., and can be configured to establish a communication connection with the target device.

The electronic device provided by the embodiment of the present disclosure can execute the screen transmission processing method provided in any embodiment of the present disclosure, and has the corresponding functional modules and beneficial effects for executing the method.

Embodiment 17

Embodiment 17 of the present disclosure further provides a computer-readable storage medium, on which a computer program is stored. When the program is executed by a processor, a screen transmission processing method is implemented.

In one case, the method includes—determining that a source device is connected to a screen transmission device, wherein the screen transmission device is in a communication connection with a target device with which a pairing is completed, determining that the source device has not been installed with a screen transmission client, wherein the screen transmission client is configured to perform a screen transmission operation between the source device and the target device through the screen transmission device, so that the target device displays screen projection interface data of the source device, acquiring an installation file of the screen transmission client from the target device through the screen transmission device, and installing the installation file to the source device so as to install the screen transmission client in the source device.

In another case, the method includes—determining that a source device is connected to a screen transmission device, wherein the screen transmission device is configured to be in a communication connection with a target device with which a pairing is completed, determining that a screen transmission client has been installed in the source device, wherein the screen transmission client is configured to perform a screen transmission operation between the source device and the target device through the screen transmission device, so that the target device displays screen projection interface data of the source device, determining that the screen transmission client is in a state to be updated, in response to the state to be updated, acquiring an update file of the screen transmission client from the target device through the screen transmission device, and according to the update file, updating the screen transmission client.

In another case, the method includes—determining that a source device is connected to a screen transmission device, wherein the screen transmission device is configured to be in a communication connection with a target device with which a pairing is completed, and starting a loader in the screen transmission device, wherein the loader is configured to determine an installation state of the screen transmission client on the source device, and according to the installation state of the screen transmission client on the source device, acquire an installation file or an update file from the target device, and send the installation file or the update file to the source device, so that the source device installs or updates the screen transmission client, and the screen transmission client is configured to perform a screen transmission operation between the source device and the target device through the screen transmission device, so that the target device displays screen projection interface data of the source device.

In another case, the method includes—determining to complete a pairing with a target device, determining to connect a source device and establishing a communication connection with the target device, determining an installation state of a screen transmission client on a source device, wherein the screen transmission client is configured to perform a screen transmission operation between the source device and the target device through the screen transmission device, according to the installation state of the screen transmission client on the source device, acquiring an installation file or an update file from the target device, and sending the installation file or the update file to the source device, so that the source device installs or updates the screen transmission client, and acquiring screen projection interface data generated by the screen transmission client in the source device, and sending the screen projection interface data to the target device for display.

In another case, the method includes—determining a loader, and burning the loader into a screen transmission device, wherein the screen transmission device is configured to connect a source device and be in a communication connection with a target device with which a pairing is completed, wherein the loader is configured to determine an installation state of the screen transmission client on the source device, according to the installation state of the screen transmission client on the source device, acquire an installation file or an update file from the target device, and send the installation file or the update file to the source device, so that the source device installs or updates the screen transmission client, and the screen transmission client is configured to perform a screen transmission operation between the source device and the target device through the screen transmission device, so that the target device displays screen projection interface data of the source device.

Definitely, the computer program of the computer-readable storage medium provided by the embodiment of the present disclosure is not limited to the method operations described above, and may further perform related operations in the screen transmission processing method provided by any embodiment of the present disclosure.

Through the above description of the embodiments, those skilled in the art can clearly understand that the present disclosure can be implemented by software and necessary general-purpose hardware. Definitely, it can also be implemented by hardware, but in many cases the former is a better implementation. Based on this understanding, the technical solution of the present disclosure can be embodied in the form of a software product in essence or the part that contributes to the prior art, which can be stored in a computer-readable storage medium, such as a computer floppy disk, Read-Only Memory (ROM), Random Access Memory (RAM), Flash, hard disk or optical disk, etc., including several instructions to make a computer device (which can be a personal computer, a server, or a network device, etc.) execute the method described in each embodiment of the present disclosure.

It is worth noting that, in the above embodiment of the screen transmission processing device, the various units and modules included are only divided in accordance with functional logic, but are not limited to the above division, as long as the corresponding function can be realized. In addition, the specific names of the units are only for the convenience of distinguishing each other, and are not used to limit the claimed scope of the present disclosure.

The foregoing description of the specific embodiments can be readily modified and/or adapted for various applications. Therefore, such adaptations and modifications are intended to be within the meaning and range of equivalents of the disclosed embodiments, based on the teaching and guidance presented herein.

The breadth and scope of the present disclosure should not be limited by any of the above-described exemplary embodiments, but should be defined only in accordance with the following claims and their equivalents.

What is claimed is:

1. A screen transmission processing method, comprising:
   determining that a source device is connected to a screen transmission device, wherein the screen transmission device is configured to be in a wireless communication connection with a target device with which a pairing is completed;
   determining that a screen transmission client has been installed in the source device, wherein the screen transmission client is configured to perform a screen transmission operation between the source device and the target device through the screen transmission device, so that the target device displays screen projection interface data of the source device;
   determining that the screen transmission client installed in the source device is in a state to be updated;
   in response to the state to be updated, acquiring an update file of the screen transmission client from the target device to the screen transmission device through the wireless communication connection; and
   according to the update file, transmitting the update file of the screen transmission client from the screen transmission device to the source device through a Universal Serial Bus (USB) interface and updating the screen transmission client installed in the source device,
   wherein the screen transmission device comprises a USB Dongle.

2. The method according to claim 1, wherein determining that the screen transmission client has been installed in the source device comprises:
   acquiring file information of the screen transmission client written by the screen transmission device to which the source device is connected;
   according to the file information, searching for a description file in the source device, wherein the description file is configured to record a client parameter of the screen transmission client; and
   in response to the description file being found, determining that the screen transmission client has been installed in the source device.

3. The method according to claim 1, wherein the screen transmission device acquires and stores a wireless communication parameter of the target device by connecting the target device, so as to complete a pairing with the target device.

4. The method according to claim 1, wherein the screen transmission client has a program file and a description file, the description file is configured to record a client parameter of the screen transmission client, and the client parameter comprises version information of the program file; and
   wherein determining that the screen transmission client installed in the source device is in the state to be updated comprises:
      reading first version information of the program file from the description file as a first version;
      acquiring second version information of the program file from the target device through the screen transmission device as a second version; and
      in response to the first version being different from the second version, determining that the screen transmission client is in the state to be updated.

5. The method according to claim 1, wherein the update file comprises a program file and a description file; and
   wherein, according to the update file, updating the screen transmission client comprises:
      determining an installation directory, wherein the installation directory is configured to store the program file and the description file of the screen transmission client;
      replacing a program file in the installation directory with the program file in the update file; and
      replacing a description file in the installation directory with the description file in the update file.

6. The method according to claim 1, wherein after determining that the screen transmission client has been installed in the source device, the method further comprises:
   determining that the screen transmission client is in a runnable state; and
   in response to the runnable state, starting the screen transmission client.

7. The method according to claim 6, wherein the screen transmission client has a program file and a description file, and the description file is configured to record a client parameter of the screen transmission client, and the client parameter comprises version information of the program file, wherein determining that the screen transmission client is in the runnable state comprises:
   reading first version information of the program file from the description file as a first version;
   acquiring second version information of the program file from the target device through the screen transmission device as a second version; and
   in response to the first version is the same as the second version, determining that the screen transmission client is in the runnable state.

8. The method according to claim 6, wherein the screen transmission client has a program file and a description file, the description file is configured to record a client parameter of the screen transmission client, and the client parameter comprises a startup parameter of the program file, wherein starting the screen transmission client in response to the runnable state comprises:
   in response to the runnable state, reading a startup parameter of the program file from the description file; and in accordance with the startup parameter, starting the program file.

9. The method according to claim 1, wherein the screen transmission device comprises at least one of a function key, a touch panel, or a joystick.

10. The method according to claim 1, wherein acquiring the update file of the screen transmission client from the target device is performed through a program in the screen transmission device.

11. A screen transmission processing method executed by a screen transmission device, comprising:
  determining to complete a pairing with a target device;
  determining to connect a source device and establishing a wireless communication connection with the target device;
  determining an installation state of the screen transmission client on the source device, wherein the screen transmission client is configured to perform a screen transmission operation between the source device and the target device through the screen transmission device;
  according to the installation state of the screen transmission client on the source device, acquiring an installation file or an update file from the target device to the screen transmission device through the wireless communication connection, and sending the installation file or the update file from the screen transmission device to the source device through a Universal Serial Bus (USB) interface, so that the source device installs or updates the screen transmission client; and
  acquiring screen projection interface data generated by the screen transmission client in the source device, and sending the screen projection interface data to the target device for display,
  wherein the screen transmission device comprises a USB Dongle.

12. The method according to claim 11, wherein completing the pairing with the target device comprises:
  connecting the target device, and acquiring and storing a wireless communication parameter of the target device.

13. The method according to claim 11, wherein acquiring the screen projection interface data generated by the screen transmission client in the source device comprises:
  receiving a user's operation on the screen transmission device, and acquiring the screen projection interface data generated by the screen transmission client of the source device.

14. A screen transmission device, comprising:
  one or more processors;
  a memory, configured to store one or more programs;
  a transmission interface, configured to connect a target device or a source device; and
  a wireless communication chip, configured to establish a wireless communication connection with the target device, wherein, when the one or more programs are executed by the one or more processors, the one or more programs cause the one or more processors to implement a screen transmission processing method, wherein the screen transmission processing method comprises:
    determining to complete a pairing with a target device;
    determining to connect the source device and establishing the wireless communication connection with the target device;
    determining an installation state of a screen transmission client on the source device, wherein the screen transmission client is configured to perform a screen transmission operation between the source device and the target device through the screen transmission device;
    according to the installation state of the screen transmission client on the source device, acquiring an installation file or an update file from the target device to the screen transmission device through the wireless communication connection, and sending the installation file or the update file from the screen transmission device to the source device through a Universal Serial Bus (USB) interface, so that the source device installs or updates the screen transmission client; and
    acquiring screen projection interface data generated by the screen transmission client in the source device, and sending the screen projection interface data to the target device for display,
  wherein the screen transmission device comprises a USB Dongle.

15. The screen transmission device according to claim 14, wherein completing the pairing with the target device comprises:
  connecting the target device, and acquiring and storing a wireless communication parameter of the target device.

16. The screen transmission device according to claim 15, wherein acquiring the screen projection interface data generated by the screen transmission client in the source device comprises:
  receiving a user's operation on the screen transmission device, and acquiring the screen projection interface data generated by the screen transmission client of the source device.

* * * * *